United States Patent [19]
Nakabo

[11] Patent Number: 6,057,722
[45] Date of Patent: May 2, 2000

[54] PULSE SIGNAL GENERATION DEVICE FOR GENERATING AND OUTPUTTING PULSE SIGNAL WITHOUT ERROR SYNCHRONIZED WITH SIGNAL OF FIXED CYCLE

[75] Inventor: Takeshi Nakabo, Kanagawa, Japan

[73] Assignee: NEC Corporation, Tokyo, Japan

[21] Appl. No.: 09/123,637

[22] Filed: Jul. 28, 1998

[30]  Foreign Application Priority Data

Jul. 29, 1997 [JP] Japan ................................ 9-203607

[51] Int. Cl.[7] ...................................................... H03K 3/017
[52] U.S. Cl. ............................................. 327/172; 327/113
[58] Field of Search ................................. 327/113, 114, 327/115, 117, 172, 173, 174

[56]  References Cited

U.S. PATENT DOCUMENTS 5,506,878 4/1996 Chiang ........................................ 377/39
5,654,757 8/1997 Murakami et al. ....................... 348/357

FOREIGN PATENT DOCUMENTS

038222 A2  4/1967  Japan .

Primary Examiner—Jeffrey Zweizig
Attorney, Agent, or Firm—Scully, Scott, Murphy & Presser

[57]  ABSTRACT

A pulse signal generation device including a reference signal cycle measuring unit for receiving input of a reference signal to calculate a cycle of the reference signal by using an appropriate clock signal, a pulse width calculation unit for obtaining the number of pulses oscillating during a period of one cycle of a reference signal and dividing a cycle of a reference signal on a clock signal basis measured by the reference signal cycle measuring unit by the number of pulses of the pulse signal to calculate a pulse width of a pulse signal on the basis of the clock signal, and a pulse signal generation unit for generating a pulse signal with a pulse width calculated by the pulse width calculation unit.

12 Claims, 25 Drawing Sheets

PULSE SIGNAL GENERATION DEVICE FOR GENERATING AND OUTPUTTING PULSE SIGNAL WITHOUT ERROR SYNCHRONIZED WITH SIGNAL OF FIXED CYCLE

BACKGROUND OF THE INVENTION

1. Field of the Invention

The present invention relates to a pulse signal generation device which outputs a predetermined number of pulses during a period of one cycle of such a signal having a prescribed frequency as a vertical synchronizing signal for use in video control.

2. Description of the Related Art

Consideration will be given to generation of a pulse signal having a fixed number of pulses oscillating during a period of one cycle of a signal S1 having a fixed cycle as shown in FIG. 14. In a case where a pulse signal S2 is to be output on the basis of the signal S1 of a fixed cycle as illustrated in the figure, a cycle of a pulse to be output (duty: 50%) will be obtained by the following calculation expression (1):

$$\frac{T1}{Np2 \times 2} = \text{half cycle of signal } S2 \quad (1)$$

In this formula, T1 represents cycle of signal S1, Np represents the number of pulses of pulse signal S2 output in one cycle of signal S1.

Assuming, for example, that a cycle of the signal S1 is 10 ms and the number of pulses of the pulse signal S2 during the period of one cycle of the signal S1 is four, a half cycle time of one pulse will be expressed as follows:

$$\frac{10 \text{ms}}{4 \times 2} = 1.25 \text{ms} \quad (2)$$

Description will be next made of program operation for controlling the number of pulses of a pulse signal during a period of one cycle of the above-described signal of a fixed cycle. In this case, the pulse signal is output by external interruption processing executed on an edge of the signal of a fixed cycle and timer interruption processing started every half cycle of the pulse signal.

FIG. 15 is a block diagram showing specific hardware structure for use in the present operation example. A pulse signal generation device 1500 shown in FIG. 15 includes a clock dividing circuit 1501 for dividing a clock signal oscillated from an external vibrator 1510, a timer count register 1502 for counting the number of clocks in a fixed time period of a divided clock signal output from the clock dividing circuit 1501, an edge detection circuit 1504 for detecting an edge of an externally applied input signal S150 of a fixed cycle, and a timer compare register 1503 for setting a pulse width of a pulse signal to be output.

FIG. 16 is a flow chart showing external interruption processing using the above-described pulse signal generation device 1500, while FIG. 17 is a flow chart showing timer interruption processing using the above-described pulse signal generation device 1500. FIG. 18 is a timing chart showing operation timing for outputting a pulse signal. Start timing of the processing by the pulse signal generation device 1500 falls on a leading edge of the externally applied signal S150 of a fixed cycle.

First at the external interruption processing shown in FIG. 16, obtain a pulse width arbitrarily predetermined for a pulse signal to be output (Step 1601) to set a value of the obtained pulse width to the timer compare register 1503 (Step 1602). Next, start outputting a pulse signal (step 1603) to start the timer (Step 1604). Then, authorize the timer interruption processing of a pulse output to finish the processing (Step 1605). Thereafter, after a lapse of a half cycle of the output pulse, the timer interruption processing shown in FIG. 17 starts.

In the timer interruption processing, first invert an output level of the pulse signal (Step 1701) to determine whether outputting of the pulse signal is to be finished or not (Step 1702). For continuing outputting of the pulse signal, set the next timer interruption time to finish the processing (Step 1703). On the other hand, for finishing outputting of the pulse signal, set timer interruption to be inhibited to finish the processing (Step 1704).

Description will be next made of the application of the above-described conventional pulse signal generation device to a lens control device of a video camera as an example. First, a stepping motor control method will be described. FIG. 19 is a block diagram showing structure of a control device for a stepping motor, while FIG. 20 is a timing chart showing a signal for driving the stepping motor. A microcomputer 1901 shown in FIG. 19 realizes each function of the pulse signal generation device 1500 shown in FIG. 15 by program control.

The microcomputer 1901 receives input of a vertical synchronizing signal S190 to output a stepping motor driving pulse signal S191, a stepping motor direction control signal S192 and a stepping motor drive authorization signal S193 to a stepping motor control IC 1902. The stepping motor driving IC 1902 outputs a stepping motor driving signal S194 composed of signals of one phase to four phases in response to each control signal sent from the microcomputer 1901. The stepping motor control IC 1902 controls drive of the stepping motor 1903 by changing an output level of the stepping motor driving signal S194 at each one pulse of the stepping motor driving pulse signal S191 sent from the microcomputer 1901.

Description will be next made of output operation of the stepping motor driving pulse signal S191 by the microcomputer 1901 for the lens control of a video camera as an example. On the microcomputer 1901 for controlling the video camera, software runs on the basis of the vertical synchronizing signal S190 for the convenience of image data processing. The microcomputer 1901 makes determination of information regarding focus every one cycle of the vertical synchronizing signal S1901 to control a focus lens in order to bring picture into focus. Also at the operation of a zoom lens, the microcomputer conducts control on the basis of the vertical synchronizing signal S190 because single operation of the zoom lens causes picture to come out of focus and therefore the zoom lens should be operated in tune with a focus lens.

Description will be here made of a case where an error occurs in a system clock of the microcomputer 1901. The system clock of the microcomputer 1901 (signal S1 of a fixed cycle) develops an error in a prescribed frequency of a vibrator due to a change in temperature and variation of performance of the vibrator. When an error is developed so as to increase a time of one cycle of the system clock S1 of the microcomputer 1901, the last output time of the pulse signal S2 shortens as shown in FIG. 21. To the contrary, when an error is developed so as to shorten a time of one cycle of the system clock S1, the last output time of the pulse signal S2 elongates as shown in FIG. 22.

Next, description will be made of driving times of a zoom motor and a focus motor. At the focusing by the operation of a focus lens, in general, when the degree of out-of-focus is high, the lens is moved to a large extent for quick focusing and when the degree of out-of-focus is low, the lens is moved slowly for focusing. Relationship between manipulation of a zoom lens and operation of the zoom lens by a zoom lever will be described in detail with reference to FIG. 23. It is assumed that a state of a zoom lever leaning toward none of the directions is referred to as neutral and that the zoom lens is shifted to a telephoto (TELE) mode or a wide angle (WIDE) mode by leaning the zoom lever to a preset direction. Leaning the zoom lever to a given direction to a large extent results in moving the zoom lens quickly to the TELE or WIDE mode and leaning the same to a small extent results in moving the lens slowly.

To move the zoom lens quickly, the number of pulses of a stepping motor driving pulse signal for a stepping motor of a zoom motor is increased which is to be output in one cycle time of the vertical synchronizing signal S190 (FIG. 24). To the contrary, to move the lens slowly, the number of pulses of the stepping motor driving pulse signal is decreased which is to be output in one cycle time of the vertical synchronizing signal S190 (FIG. 25). At the zoom motor, as the rate of error in a pulse oscillation interval of a stepping motor driving pulse signal is increased, a generated driving sound is increased. Therefore, as shown in FIG. 24, moving the zoom lens quickly will increase the rate of error in a pulse oscillation interval of the stepping motor driving pulse signal, resulting in generating a big driving sound. To the contrary, as shown in FIG. 25, moving the zoom lens slowly decreases the rate of error in a pulse oscillation interval of the stepping motor driving pulse signal, resulting in generating a relatively little driving sound.

As described in the foregoing, since a conventional pulse signal generation device develops an error in a system clock of a microcomputer due to a change in temperature and difference in performance of a vibrator itself, the device is incapable of generating an accurate pulse signal.

At the control of drive of a stepping motor, for example, because a stepping motor driving pulse signal as a relevant pulse signal contains an error, the stepping motor can not be driven accurately.

Also when the stepping motor is run at a high speed, a pulse width of the stepping motor driving pulse signal shortens to increase the rate of error in a pulse width, resulting in increasing the rate of error of a vibrator with respect to the stepping motor driving pulse signal. Driving sound of the stepping motor is therefore increased.

As the driving sound of the stepping motor is increased, the driving sound of the stepping motor will be recorded as noise during the picture recording by a video camera.

SUMMARY OF THE INVENTION

An object of the present invention is to provide a pulse signal generation device which can solve the above-described conventional shortcomings and is capable of constantly generating an accurate pulse signal by adjusting a pulse width of a pulse signal to be output on the basis of a reference signal having a fixed frequency and a method therefor.

Another object of the present invention is to provide a pulse signal generation device, when applied to stepping motor drive control, capable of preventing a driving sound from increasing by outputting a stable driving pulse signal and a method therefor.

A further object of the present invention is to provide a pulse signal generation device, when applied to an infrared remote controller, enabling correction of a clock signal for use in the generation of a remote control signal to eliminate the need of a vibrator of high precision for the generation of a clock signal and a method therefor.

According to the first aspect of the invention, a pulse signal generation device for generating a pulse signal with a predetermined frequency corresponding to a reference signal having a fixed cycle, comprises reference signal cycle measuring means for receiving input of the reference signal to calculate a cycle of the reference signal using an appropriate clock signal, pulse width calculation means for obtaining the number of pulses oscillating during a period of one cycle of the reference signal and dividing the cycle of the reference signal on the basis of the clock signal measured by the reference signal cycle measuring means by the number of pulses of the pulse signal to calculate a pulse width of the pulse signal on the basis of the clock signal, and pulse signal generation means for generating a pulse signal with a pulse width calculated by the pulse width calculation means.

In the preferred construction, the reference signal cycle measuring means counts the number of clocks of the clock signal oscillated during a period of one cycle of the reference signal to obtain a cycle of the reference signal measured by the clock signal.

In the preferred construction, the pulse width calculation means compares a calculated value of the cycle of the reference signal on the basis of the clock signal which is calculated on the assumption that the clock signal has no error and a measured value of the cycle of the reference signal obtained by actually measuring a cycle of the reference signal using the clock signal to calculate an error of the clock signal, and corrects a calculated value of the pulse width of the pulse signal on the basis of the clock signal based on an error of the clock signal.

In the preferred construction, the reference signal cycle measuring means counts the number of clocks of the clock signal oscillated during a period of one cycle of the reference signal to obtain a cycle of the reference signal measured by the clock signal, and the pulse width calculation means compares a calculated value of the cycle of the reference signal on the basis of the clock signal which is calculated on the assumption that the clock signal has no error and a measured value of the cycle of the reference signal obtained by actually measuring a cycle of the reference signal using the clock signal to calculate an error of the clock signal, and corrects a calculated value of the pulse width of the pulse signal on the basis of the clock signal based on an error of the clock signal.

In another preferred construction, the reference signal cycle measuring means, the pulse width calculation means and the pulse signal generation means are provided on a microcomputer for controlling drive of a stepping motor for use in lens control of a video camera, the reference signal is a vertical synchronizing signal, the clock signal is a system clock signal of the microcomputer, and the pulse signal to be generated is a pulse signal for controlling the stepping motor.

In another preferred construction, the reference signal cycle measuring means, the pulse width calculation means and the pulse signal generation means are provided on a microcomputer mounted on an infrared ray remote controller, the reference signal is a first clock signal to be used for a timer function, the clock signal is a second clock signal for use in the generation of a remote control signal, the pulse signal to be generated is the remote control signal, and the pulse width calculation means compares a calculated value of the cycle of the first clock signal on the basis of the second clock signal which is calculated on the assumption that the second clock signal has no error and a measured value of the cycle of the first clock signal obtained by actually measuring a cycle of the first clock signal using the second clock signal to calculate an error of the second clock signal, and corrects a calculated value of the pulse width of the remote control signal on the basis of the second clock signal based on an error of the second clock signal.

According to the second aspect of the invention, a pulse signal generation method of generating a pulse signal with a predetermined frequency corresponding to a reference signal having a fixed cycle, comprising the steps of:

receiving input of the reference signal to calculate a cycle of the reference signal using an appropriate clock signal, obtaining the number of pulses oscillating during a period of one cycle of the reference signal and dividing the cycle of the reference signal on the basis of the clock signal by the number of pulses of the pulse signal to calculate a pulse width of the pulse signal on the basis of the clock signal, and generating a pulse signal with a calculated pulse width.

In the preferred construction, at the step of calculating a cycle of the reference signal, the number of clocks of the clock signal oscillated during a period of one cycle of the reference signal is counted to obtain a cycle of the reference signal measured by the clock signal.

In the preferred construction, the pulse width calculation step comprises the steps of comparing a calculated value of the cycle of the reference signal on the basis of the clock signal which is calculated on the assumption that the clock signal has no error and a measured value of the cycle of the reference signal obtained by actually measuring a cycle of the reference signal using the clock signal to calculate an error of the clock signal, and correcting a calculated value of the pulse width of the pulse signal on the basis of the clock signal based on an error of the clock signal.

According to another aspect of the invention, a computer readable memory storing a computer program for controlling a pulse signal generation device for generating a pulse signal with a predetermined frequency corresponding to a reference signal having a fixed cycle, the computer program comprising the steps of:

receiving input of the reference signal to calculate a cycle of the reference signal using an appropriate clock signal, obtaining the number of pulses oscillating during a period of one cycle of the reference signal and dividing the cycle of the reference signal on the basis of the clock signal by the number of pulses of the pulse signal to calculate a pulse width of the pulse signal on the basis of the clock signal, and generating a pulse signal with a calculated pulse width.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
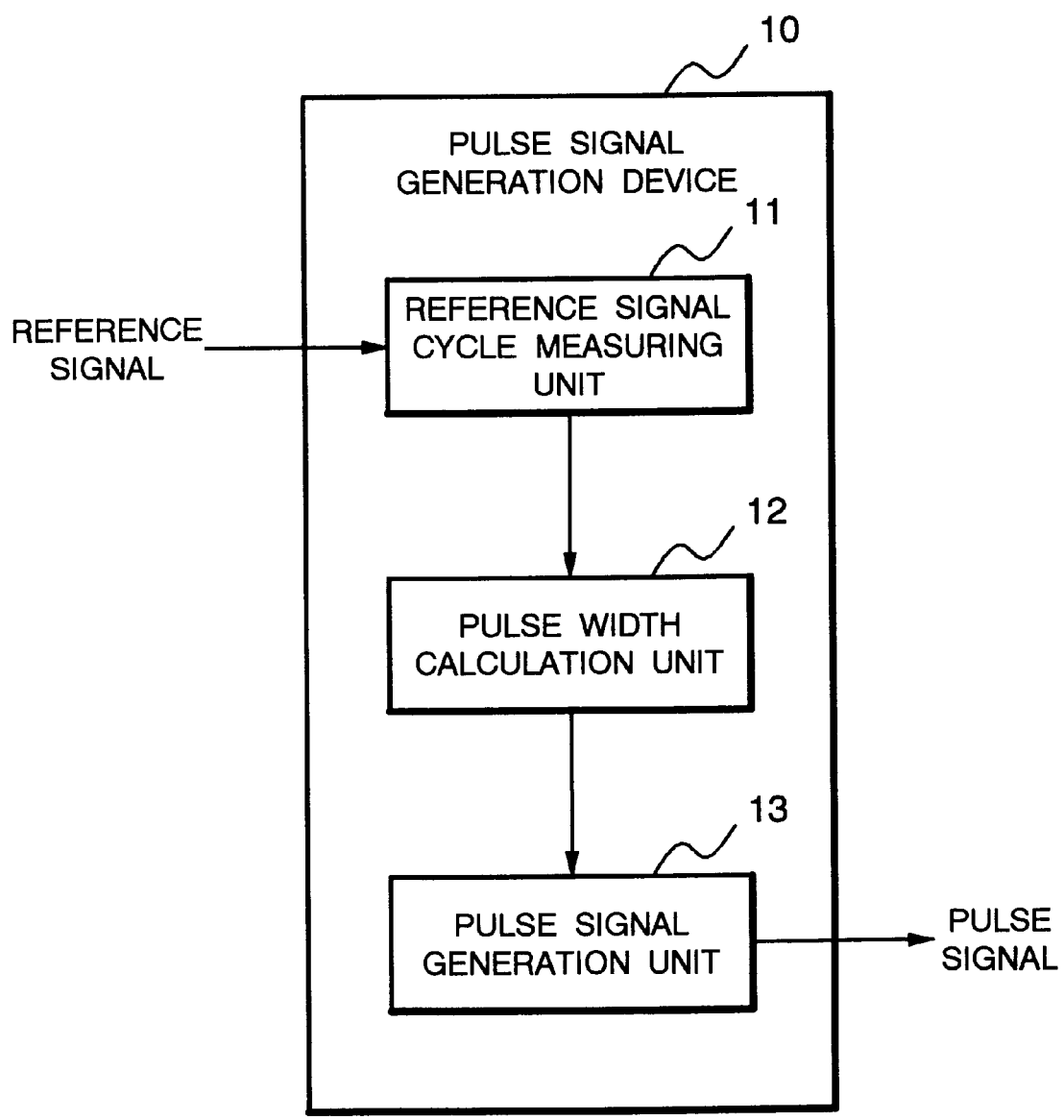
FIG. 1 is a block diagram showing structure of a pulse signal generation device according to one embodiment of the present invention.

FIG. 1 is a block diagram schematically showing structure of a pulse signal generation device according to one embodiment of the present invention. A pulse signal generation device 10 of the present embodiment, using a reference signal of a fixed cycle, generates and outputs a pulse signal with a desired pulse width shorter than the cycle of the reference signal. With reference to FIG. 1, the pulse signal generation device 10 of the present embodiment includes a reference signal cycle measuring unit 11 for measuring a cycle of a reference signal, a pulse width calculation unit 12 for determining a pulse width (cycle) of a pulse signal to be output based on a calculation result obtained by the reference signal cycle measuring unit 11 and a pulse signal generation unit 13 for generating and outputting a pulse signal with a pulse width of j determined by the pulse width calculation unit 12. In FIG. 1, illustration is made only of a characteristic part of the structure of the present embodiment and that of the remaining common part is omitted. The pulse signal generation device 10 is implemented by a computer-program-controlled microcomputer. A computer program for controlling the microcomputer is stored for provision in a common storage medium such as a magnetic disk, an optical disk or a semiconductor memory. The program is loaded into an internal memory of the microcomputer to control a data processing device, thereby executing the functions of the above-described reference signal cycle measuring unit 11, the pulse width calculation unit 12 and the pulse signal generation unit 13.

In the above-described structure, the reference signal cycle measuring unit 11 receives input of a reference signal and calculates a cycle of the reference signal using an appropriate clock signal. More specifically, by counting the number of clocks of a clock signal oscillated during a period of one cycle of a reference signal, the unit 11 obtains a cycle of the reference signal measured by the clock signal in question.

The pulse width calculation unit 12 obtains the number of pulses of a pulse signal to be output which are oscillated during a period of one cycle of a reference signal and divides the cycle of the reference signal measured by the reference signal cycle measuring unit 11 by the number of pulses of the pulse signal to be output to calculate a cycle of the pulse signal on the basis of said clock signal, that is, a pulse width. In practice, various calculation methods can be adopted according to purposes of a pulse signal to be generated. It is for example possible to divide a cycle of a reference signal by twice the value of the number of pulses of a pulse signal to be output to calculate a time of a half cycle of the pulse signal to be output.

The pulse signal generation unit 13 generates and outputs a pulse signal with a desired pulse width based on a calculation result obtained by the pulse width calculation unit 12. When a time of a half cycle of the pulse signal is calculated at the pulse width calculation unit 12 as in the above-described example, a pulse signal whose one cycle has a desired period can be output by inverting an output level of an output signal every half cycle in question.

Figure 2:
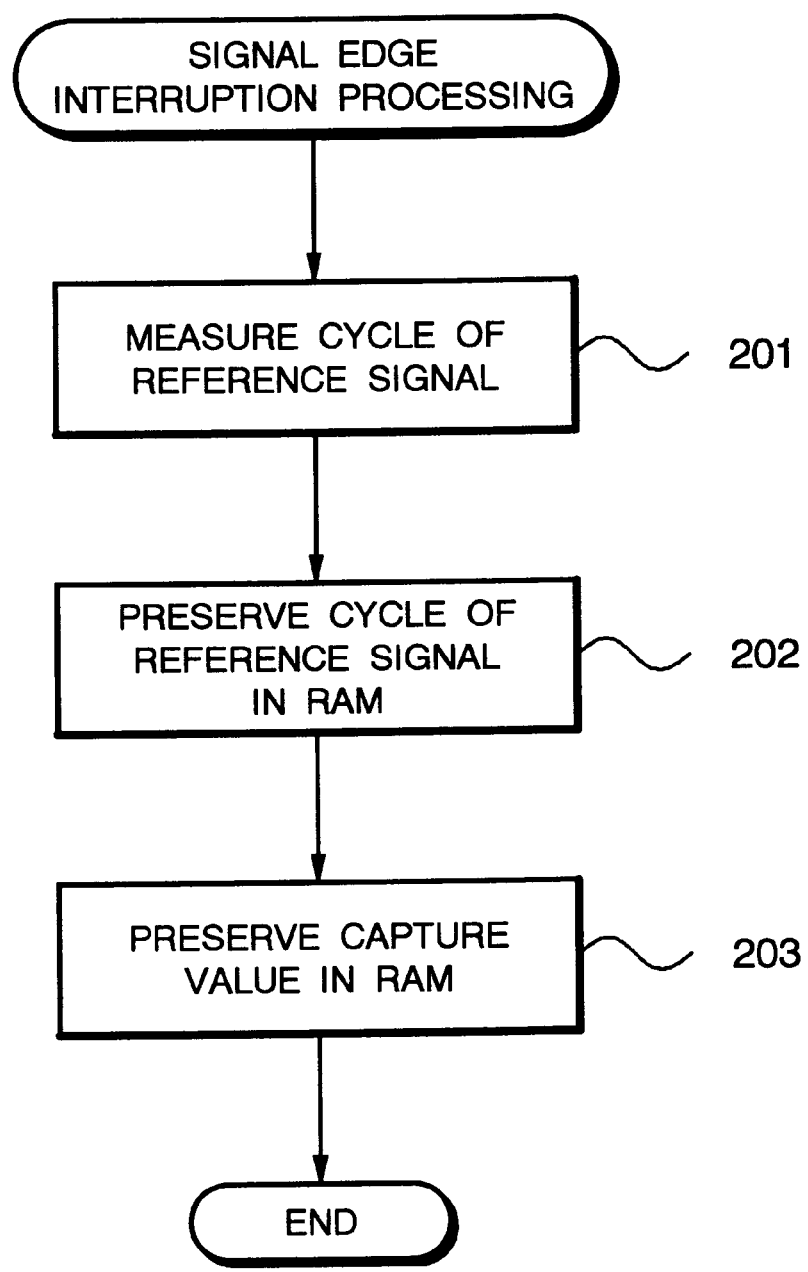
FIG. 2 is a flow chart showing operation to be conducted when the present embodiment is applied to lens control of a video camera, which is a diagram showing operation of signal edge interruption processing.
Figure 3:
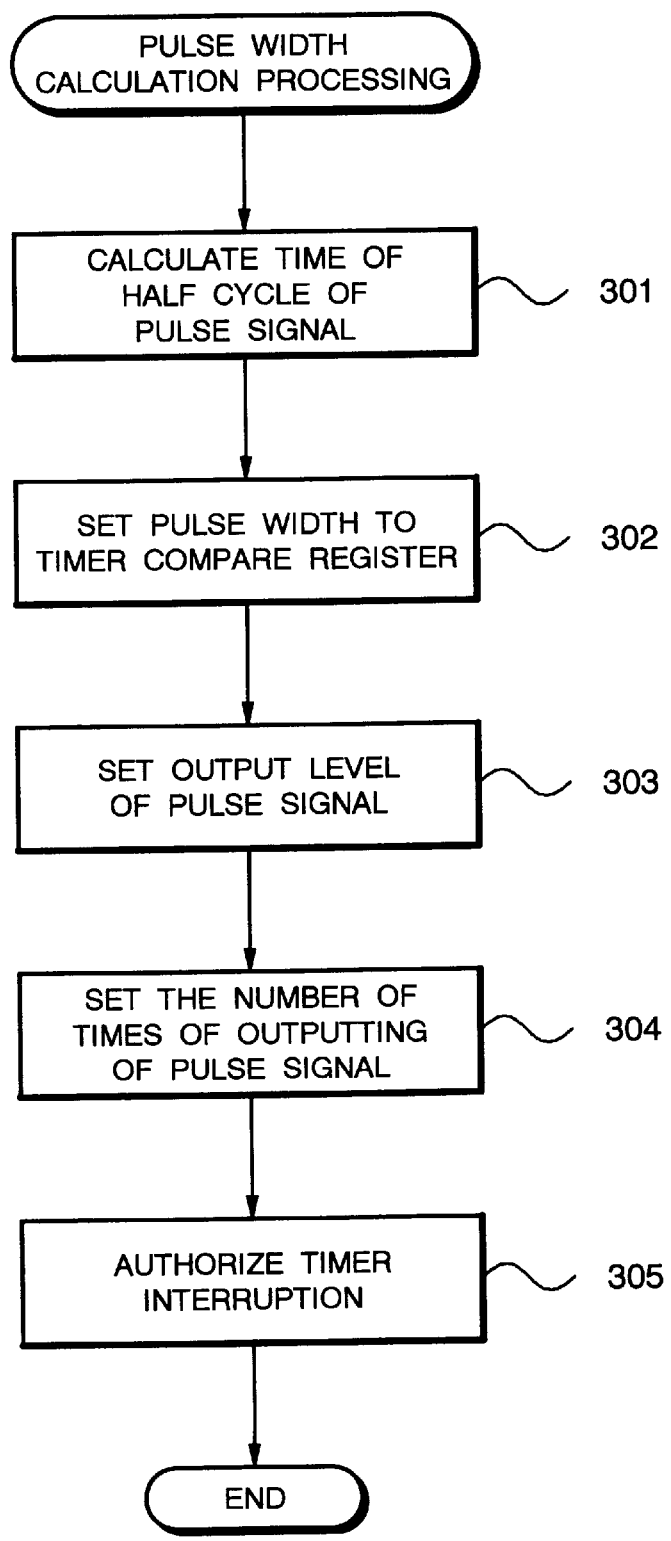
FIG. 3 is a flow chart showing operation to be conducted when the present embodiment is applied to lens control of a video camera, which is a diagram showing operation of pulse width calculation processing.
Figure 4:
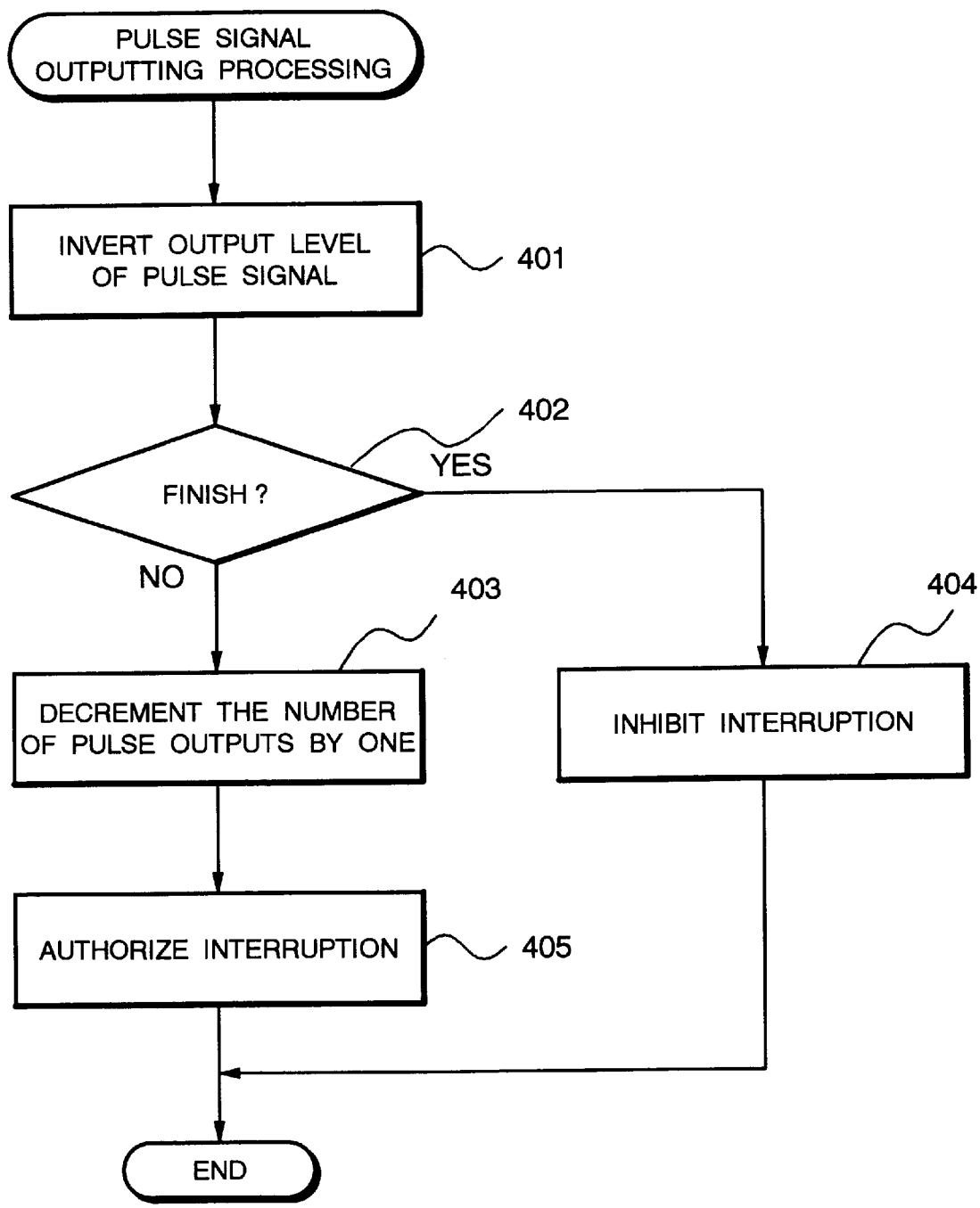
FIG. 4 is a flow chart showing operation to be conducted when the present embodiment is applied to lens control of a video camera, which shows operation of pulse signal outputting processing.
Figure 5:
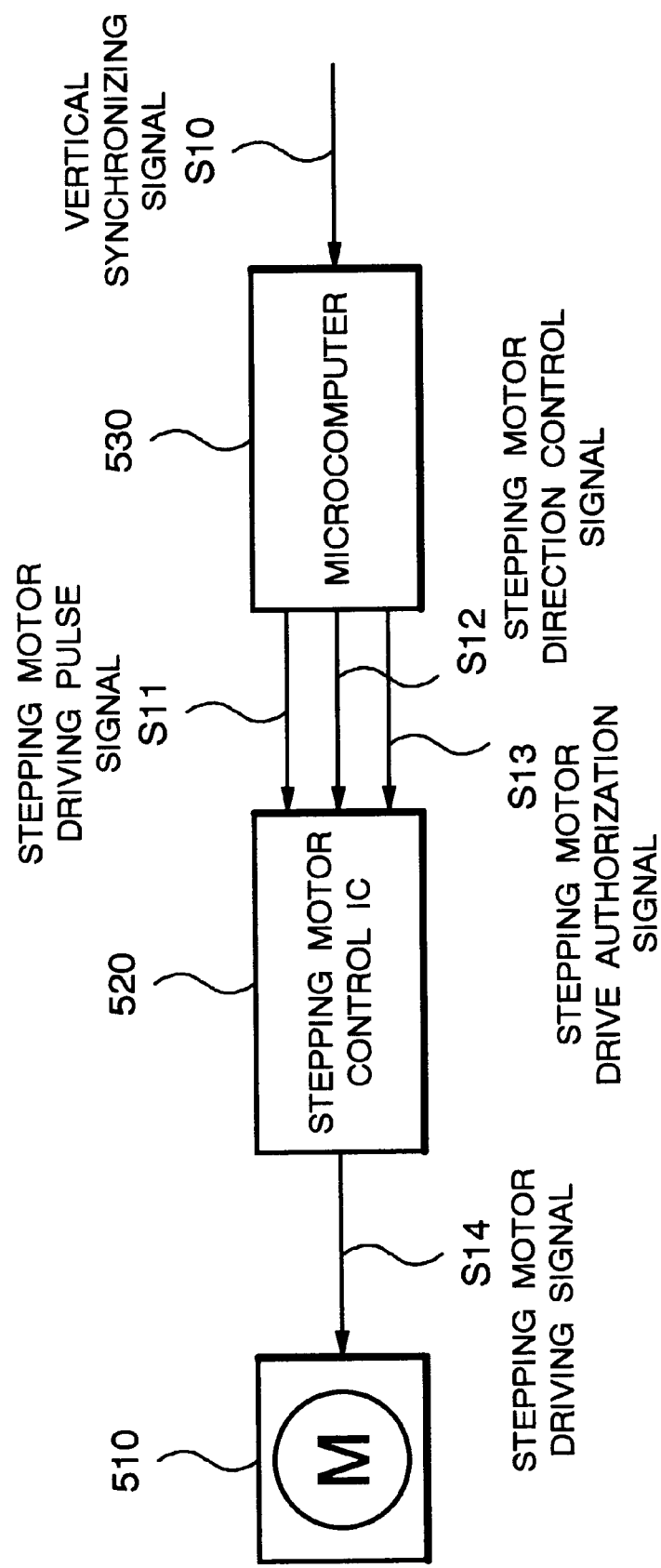
FIG. 5 is a block diagram showing structure of a stepping motor control device to which the present embodiment is applied.

Next, specific description will be made of the application of the pulse signal generation device of the present embodiment to lens control of a video camera as an example. FIGS. 2 to 4 are flow charts showing operation of the respective processing to be conducted in this case. FIG. 5 is a block diagram showing structure of a stepping motor control device. With reference to FIG. 5, the stepping motor control device includes a stepping motor control IC 520 for controlling drive of a stepping motor 510 and a microcomputer 530 for controlling the stepping motor control IC, in which the pulse signal generation device 10 of the present embodiment shown in FIG. 1 is mounted on the microcomputer 530.

In FIG. 5, a vertical synchronizing signal S10 applied to the microcomputer 530 is a reference signal of a fixed cycle. A system clock signal output from a built-in timer in the microcomputer 530 is a clock signal whose cycle is shorter than that of the vertical synchronizing signal S10. Also, the microcomputer 530 outputs a stepping motor driving pulse signal S1. Operation for controlling a video camera is all conducted on the basis of the vertical synchronizing signal S10. Control of a focus lens and a zoom lens which are not shown is therefore conducted in the same manner.

Figure 6:
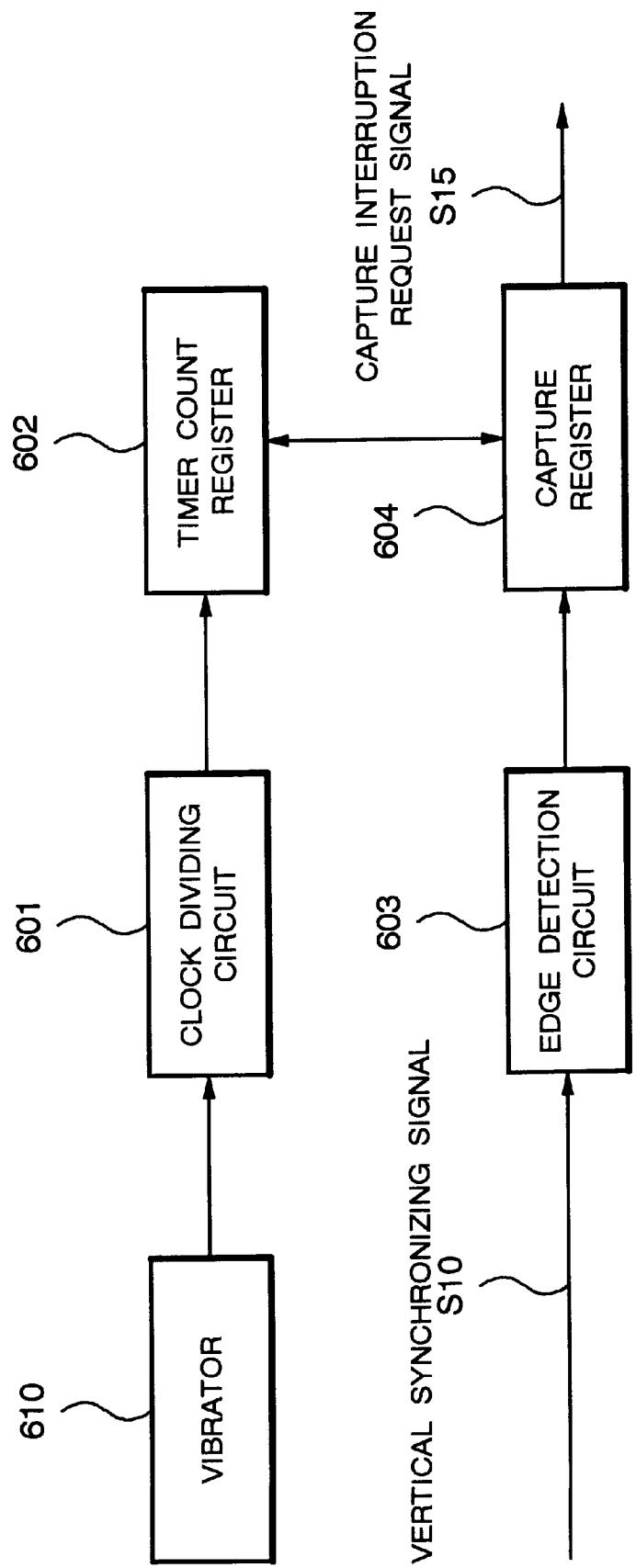
FIG. 6 is a block diagram showing hardware structure responsible for capture interruption at the stepping motor control device of FIG. 5.

FIG. 6 is a block diagram showing hardware structure for conducting capture interruption. With reference to FIG. 6, the structure includes a vibrator 610, a clock dividing circuit 601 for dividing a clock signal which is an output of the vibrator 610 to generate a system clock signal of the microcomputer 530, a timer count register 602 for counting an output of the clock dividing circuit 601, an edge detection circuit 603 for detecting an edge of the vertical synchronizing signal S10, and a capture register 604 for storing a count value of the timer count register 602 at the timing of an output of the edge detection circuit 603. Of the above-described structure, the clock dividing circuit 601, the timer count register 602, the edge detection circuit 603 and the capture register 604 are implemented on the microcomputer 530 by the control by a computer program and operate as the reference signal cycle measuring unit 11 shown in FIG. 1.

Figure 7:
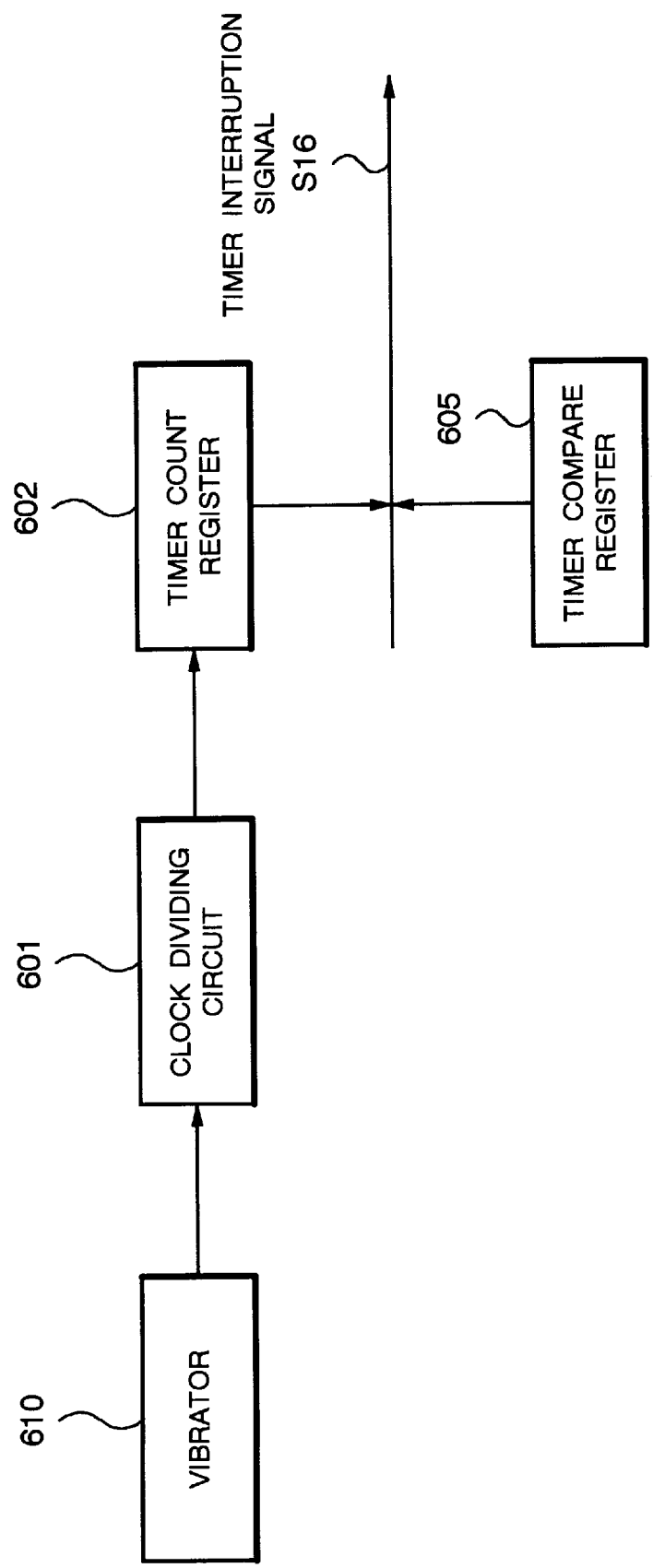
FIG. 7 is a block diagram showing hardware structure responsible for timer interruption at the stepping motor control device of FIG. 5.

FIG. 7 is a block diagram showing hardware structure for conducting timer interruption. With reference to FIG. 7, the structure includes a vibrator 610, a clock dividing circuit 601, a timer count register 602 and a timer compare register 605 for setting a time of a half cycle of a stepping motor driving pulse signal as a pulse signal to be output. Of the above-described structure, the vibrator 610, the clock dividing circuit 601 and the timer count register 602 are the same as their counterpart components shown in FIG. 6, which are used for capture interruption and timer interruption in common. In addition, the clock dividing circuit 601, the timer count register 602 and the timer compare register 605 are implemented on the microcomputer 530 by the control by a computer program and operate as the pulse width calculation unit 12 shown in FIG. 1.

Upon detection of an edge of the applied vertical synchronizing signal S10 by the edge detection circuit 603 as the initial operation, the capture register 604 stores a count value of the timer count register 602 at the timing of the detection of the edge by the edge detection circuit 603. Then, at the same timing, the unit 604 outputs a capture interruption request signal S15. In response to the capture interruption request signal S15, the microcomputer 530 activates the signal edge interruption processing by the reference signal cycle measuring unit 11 and the pulse width calculation processing by the pulse width calculation unit 12.

In the signal edge interruption processing shown in FIG. 2, a time of one cycle of the vertical synchronizing signal S10 is measured. In the signal edge interruption processing, as will be described later, a register value stored in the capture register 604 is preserved in a RAM as an internal memory. Then, upon output of the capture interruption signal from the capture register 604, a cycle Tcr of the vertical synchronizing signal S10 on the basis of the system clock signal is calculated according to the following expression (3) based on a register value CR0 of the capture register 604 preserved in the RAM by the previous signal edge interruption processing and a register value CR1 of the capture register 604 obtained at the current output of the capture interruption signal.

Tcr=(the number of times of overflows×10000 H)+CR1 −CR0 (3)

The number of times of overflows denotes the number of times when the count of system clock signals divided by the clock dividing circuit 601 made by the timer count register 602 overflows, while 10000 H denotes that the timer count register 602 of the present embodiment counts the system clock signals by means of a 16-bit timer.

Next, store the calculated cycle of the vertical synchronizing signal S10 in the RAM as the internal memory (Step 202) and similarly store the register value CR1 of the capture register 604 obtained by the present processing in the RAM (Step 203).

Next, description will be made of pulse width calculation processing with respect to the stepping motor driving pulse signal shown in FIG. 3. First, a time Tsp of a half cycle of the stepping motor driving pulse signal S11 is calculated based on the above-described cycle Tcr of the vertical synchronizing signal S10 measured at the signal edge interruption processing and a desired number of pulses P set for the stepping motor driving pulse signal according to the following expression (4) (Step 301):

$$Tsp = \frac{Tcr}{P \times 2} \quad (4)$$

Next, set a time of a half cycle of the stepping motor driving pulse signal S11 calculated by the above calculation to the timer compare register 605 (Step 302). Then, set an initial output level of the stepping motor driving pulse signal S11 (Step 303) and further set the number of pulses to be output (Step 304) to subsequently set the timer interruption to be authorized (Step 305). After the lapse of the time set to the timer compare register 605 after the execution of the foregoing operation, outputting processing of the stepping motor driving pulse signal S11 is activated by the timer interruption processing.

Next, the pulse signal generation unit 13 executes the outputting processing of the stepping motor driving pulse signal shown in FIG. 4. First, the unit 13 inverts an output level of the output stepping motor driving pulse signal S11 (Step 401) to determine whether to finish the outputting of the stepping motor driving pulse signal S11 (Step 402). For continuing the outputting of the stepping motor driving pulse signal S11, the number of the pulses of the stepping motor driving pulse signal is counted with the number of outputs decremented by "one" at Step S122(403?)(Step 403) to subsequently authorize the next pulse signal outputting processing to interrupt (Step 404). Then, upon completion of the outputting as many times as the number of pulses set at Step 304 of FIG. 3, the unit 13 inhibits the following pulse signal outputting processing from interrupting to finish the processing (Steps 402 and 404).

The foregoing operation is summarized as follows. A cycle of the vertical synchronizing signal S10 applied to the microcomputer 530 is measured by a built-in timer (system clock signal) of the microcomputer 530 and the obtained cycle is divided by a desired number of pulses set for the stepping motor driving pulse signal S11 to calculate a cycle of the stepping motor driving pulse signal S11, so that the stepping motor 510 is driven by the stepping motor driving pulse signal S11 having the obtained cycle. It is therefore possible, even when the frequency of the vibrator 610 of the microcomputer 530 changes, to constantly output the stepping motor driving pulse signal S11 with the same width by setting the number of pulses of the stepping motor driving pulse signal S11 for the vertical synchronizing signal S10 to be the same. Furthermore, by changing the setting of the number of output pulses of the stepping motor driving pulse signal S11, it will be possible to output the stepping motor driving pulse signal S11 according to the number of pulses in question.

Figure 8:
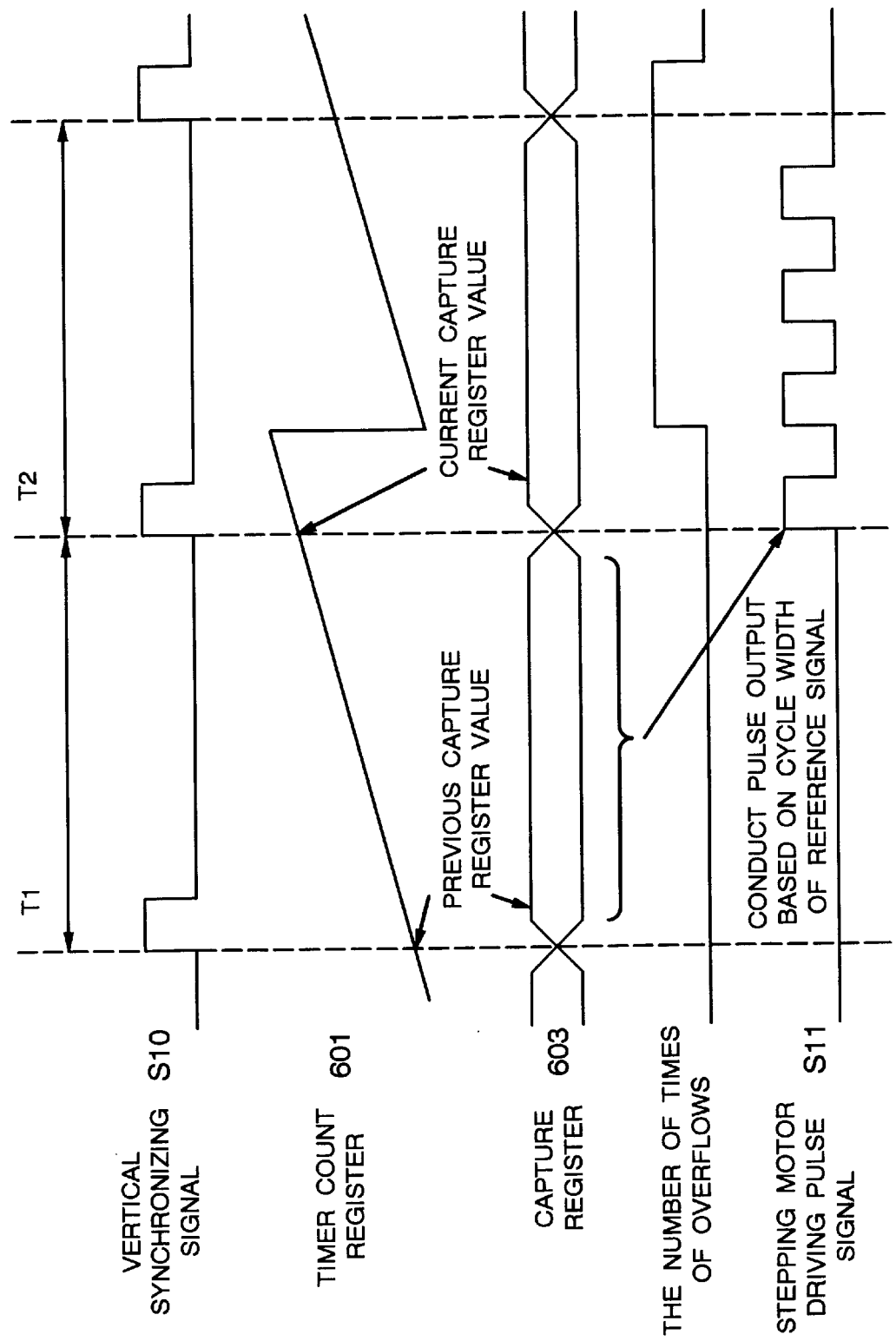
FIG. 8 is a time chart for use in explaining concept of a timer count.

In addition, since a signal width is measured in one cycle (T1 in FIG. 8) of the vertical synchronizing signal S10 and the stepping motor driving pulse signal S11 is output in the next one cycle (T2 in FIG. 8) of the vertical synchronizing signal S10 as shown in FIG. 8, frequency change of the vibrator can be recognized in real time to modify a pulse width of the stepping motor driving pulse signal S11. As a result, even when the frequency of the vibrator changes irregularly due to various factors, an accurate stepping motor driving pulse signal can be constantly output for the vertical synchronizing signal S10.

As described in the foregoing, since in the above application example, a cycle of the vertical synchronizing signal S10 is measured by using a reference clock signal on the basis of a clock signal generated by the vibrator 610 and a pulse width of the stepping motor driving pulse signal S11 is determined based on the calculation result, a pulse signal obtained by precisely dividing the vertical synchronizing signal S10 can be output. As a result, an output time of the stepping motor driving pulse signal S11 will be neither elongated nor shortened, which enables the stepping motor 510 to operate smoothly.

This arrangement decreases a driving sound of the stepping motor to prevent recording of the driving sound of the stepping motor during picture recording of the video camera. In addition, when the stepping motor is operated at a high speed, increase in a driving sound of the stepping motor can be prevented because no error occurs in a pulse width.

Figure 9:
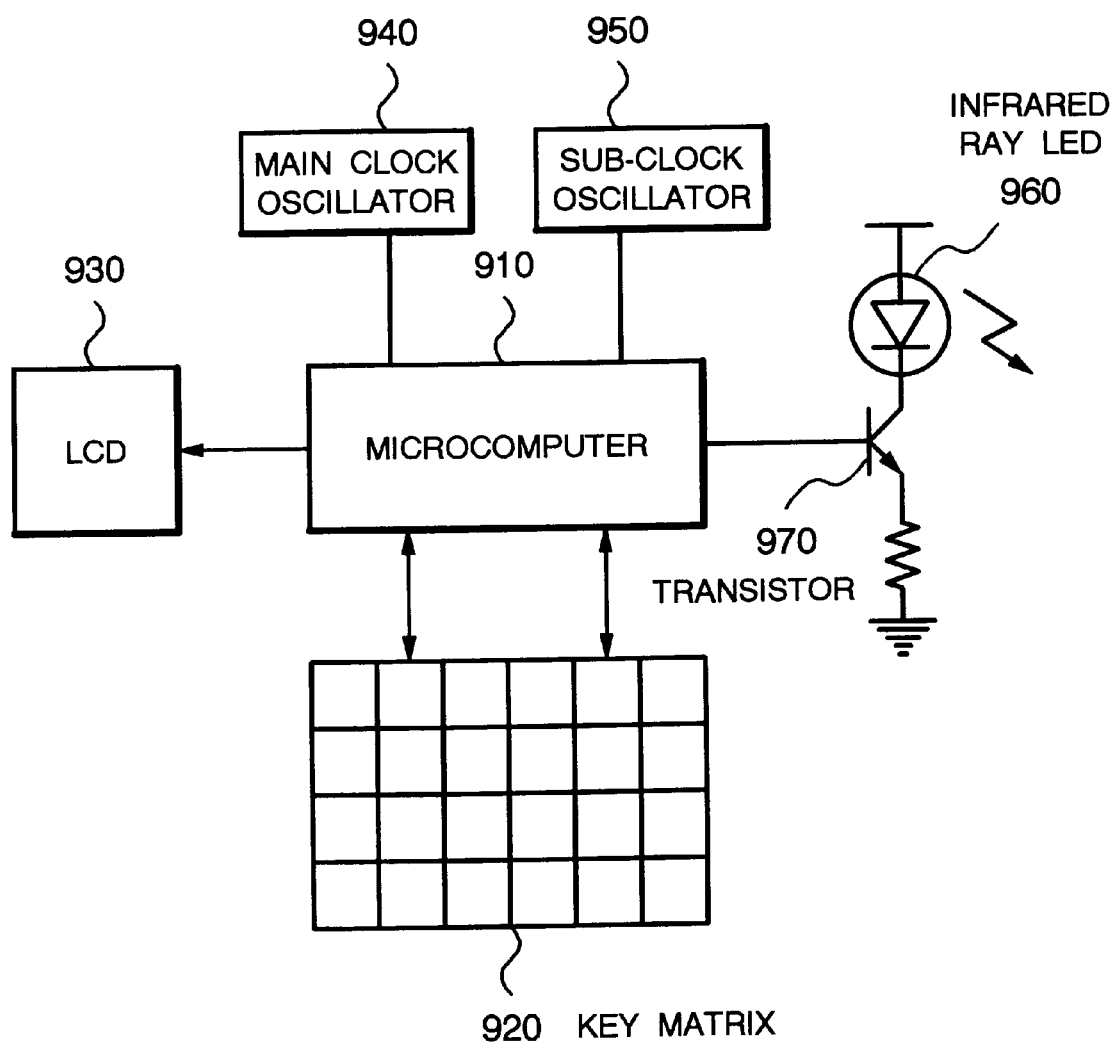
FIG. 9 is a block diagram showing structure of an infrared ray remote controller to which the present embodiment is applied.

Next, specific description will be given of the application of the pulse signal generation device of the present embodiment to an infrared ray remote controller as an example. FIG. 9 is a block diagram showing structure of an infrared ray remote controller. With reference to FIG. 9, the infrared ray remote controller includes a microcomputer 910, a key matrix 920 for receiving input of a command, an LCD display panel 930, a main clock oscillator 940 for outputting a main clock signal, a sub-clock oscillator 950 for outputting a sub-clock signal, an infrared ray LED 960 and a transistor 970 for signal amplification, in which the pulse signal generation device 10 of the present embodiment shown in FIG. 1 is mounted on the microcomputer 910.

In the above-described structure, commonly used as the sub-clock oscillator 950 is a 32.768 kHz crystal vibrator for serving also for the timer function. In general, error of the crystal vibrator is approximately ±0.001%. Used as the main clock oscillator 940 is a vibrator for program operation to output a remote control signal. Description will be here made of a case where a vibrator with an oscillation frequency error of several percentages as in RC oscillation is used as the main clock oscillator 940.

Figure 10:
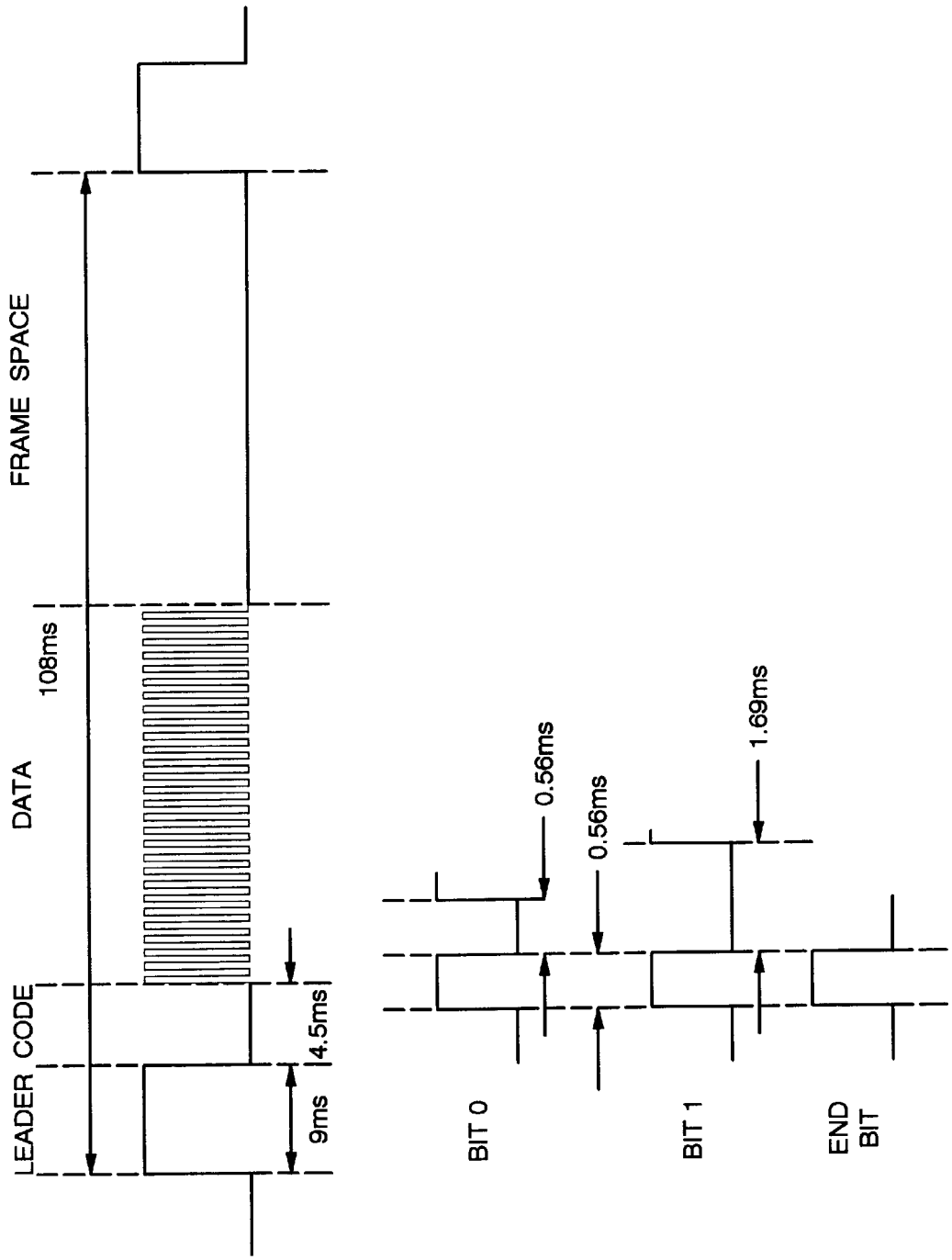
FIG. 10 is a diagram showing one example of a remote control signal.

The following description will be made on the assumption that a signal obtained by dividing an output signal of the sub-clock oscillator 950 by $2^{14}$ to have a cycle (500 ms) fixed in advance is a sub-clock signal, an output signal of the main clock oscillator 940 having a frequency higher than that of a sub-clock signal is a main clock signal, and a pulse signal output from the microcomputer 910 (pulse signal generation device 10) is a remote control signal. FIG. 10 is a conceptual diagram showing one example of a format of a remote control signal. The format of a remote control signal shown in FIG. 10 is composed of a leader code, a 32-bit data code, an end bit and a frame space. Pulse widths of the data bits are precisely defined for bit 0 and for bit 1 as shown in the figure.

In thus structured infrared ray remote controller, the pulse signal generation device 10 measures a cycle of a sub-clock signal using a main clock signal to generate a remote control signal based on the measurement result. Unlike the control of a stepping motor, with respect to a remote control signal, not the number of pulses oscillated during a period of one cycle of a sub-clock signal is set but a pulse width is defined according to the contents of data as mentioned above. A cycle of the sub-clock signal is accurately set in advance. Therefore, based on a result of measurement of a cycle of a sub-clock signal by using a main clock signal, an error in a frequency of the main clock signal is corrected as required to generate a remote control signal using the corrected main clock signal.

Figure 11:
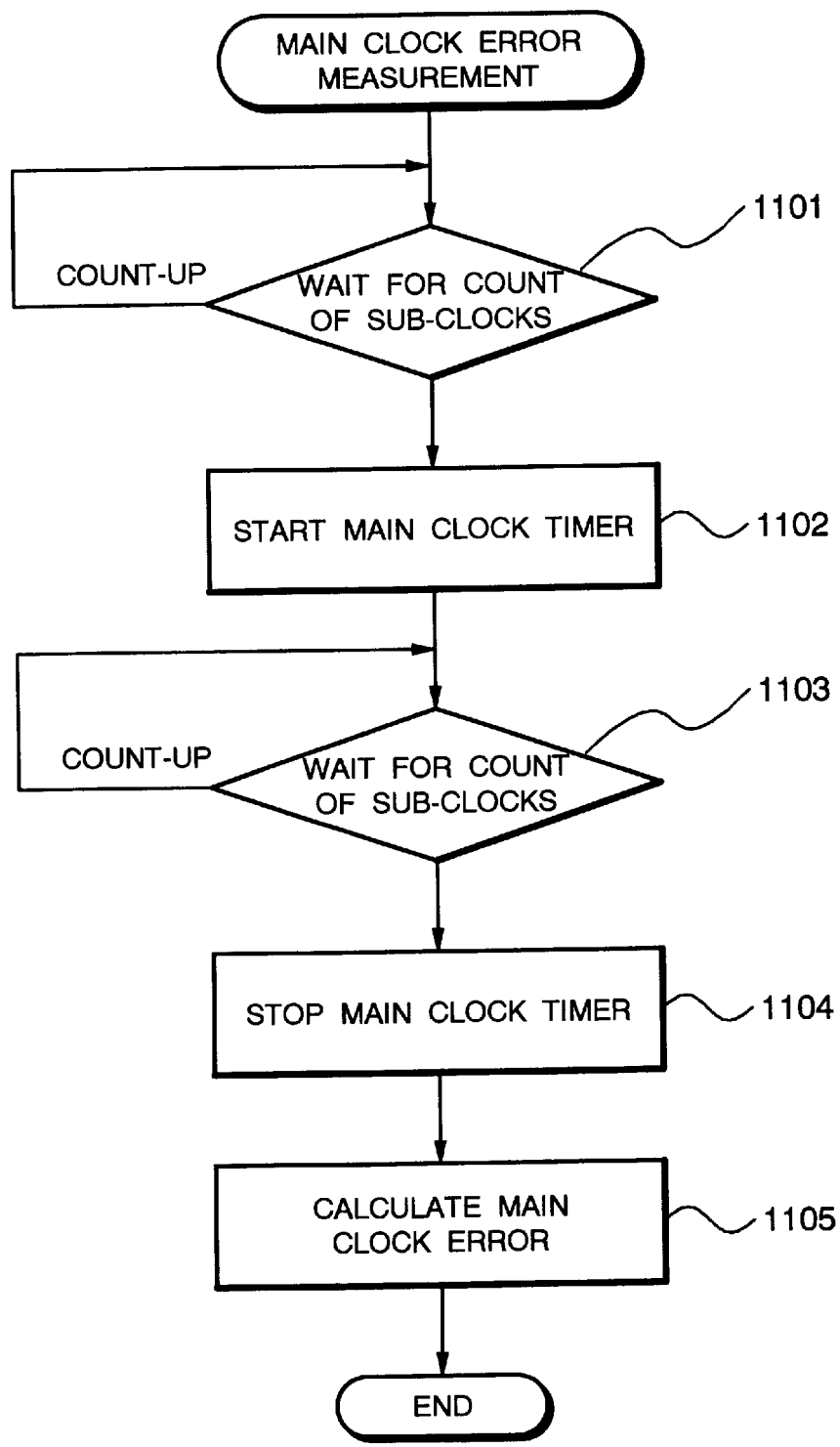
FIG. 11 is a flow chart showing operation to be conducted when the present embodiment is applied to the infrared remote controller, which is a diagram showing operation of main clock error measuring processing.

FIG. 11 is a flow chart showing operation of main clock signal error measurement processing. First, wait for the synchronization with the count-up of a sub-clock signal to start timer count by a main clock signal (Steps 1101 and 1102). Next, again wait for the synchronization with the count-up of the sub-clock signal to stop timer count by the main clock signal (Steps 1103 and 1104). Then, calculate an error of the main clock signal using the count value of the timer (Step 1105).

Figure 13:
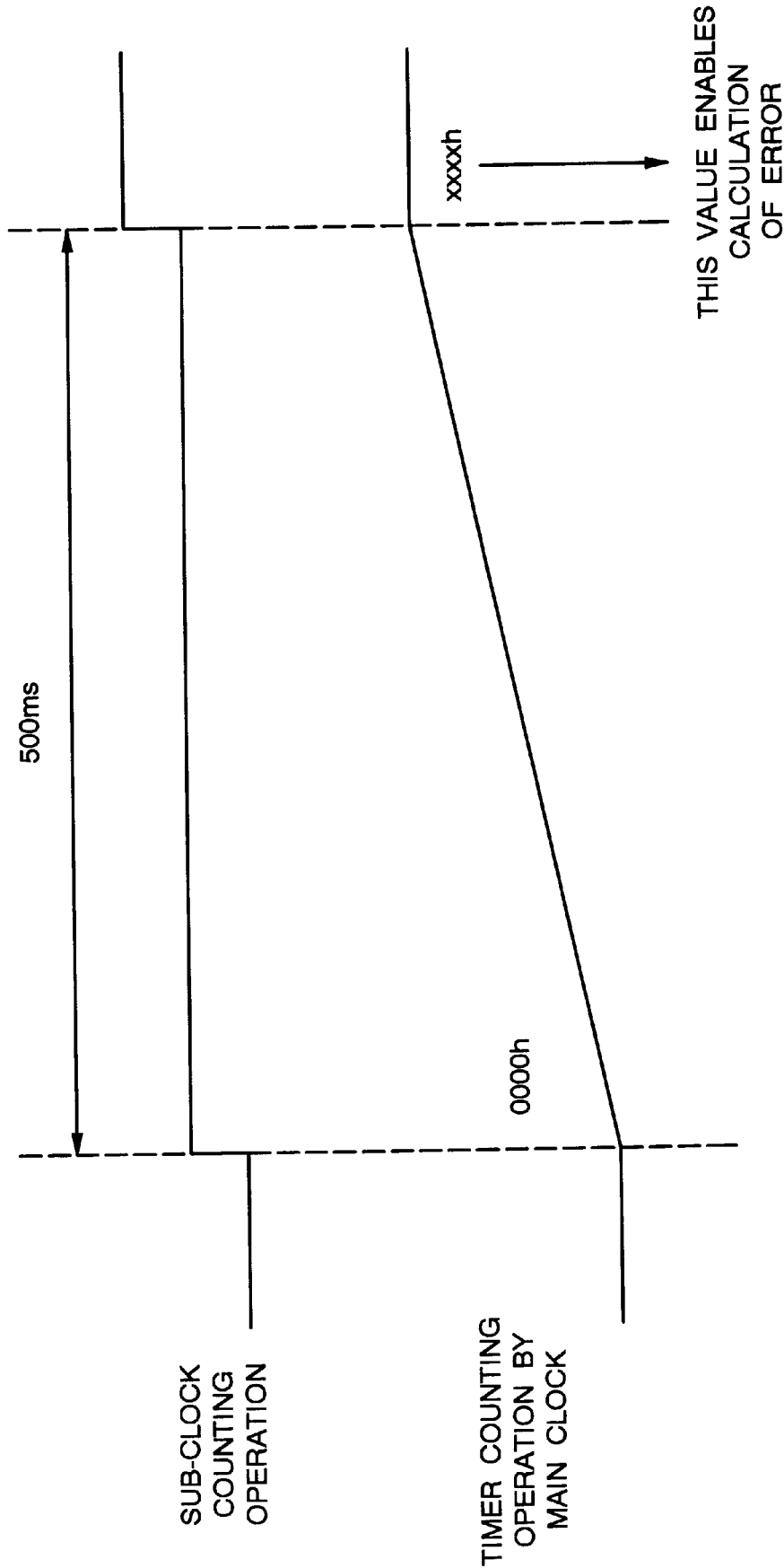
FIG. 13 is a diagram for use in explaining timer operation in the main clock error measurement.
Figure 14:
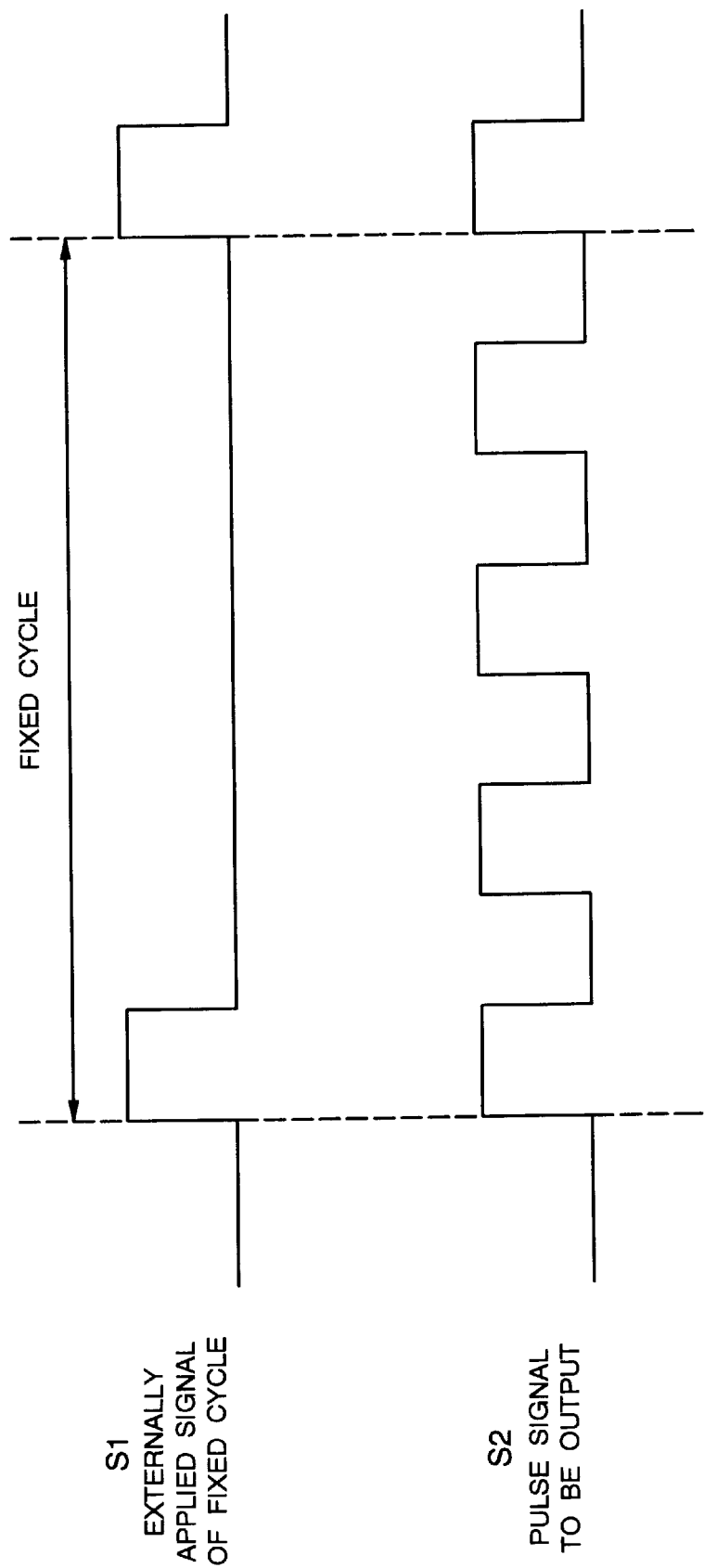
FIG. 14 is a time chart showing a relationship, at the outputting of a pulse signal in accordance with a cycle of an external signal, between the external signal and the pulse signal.
Figure 15:
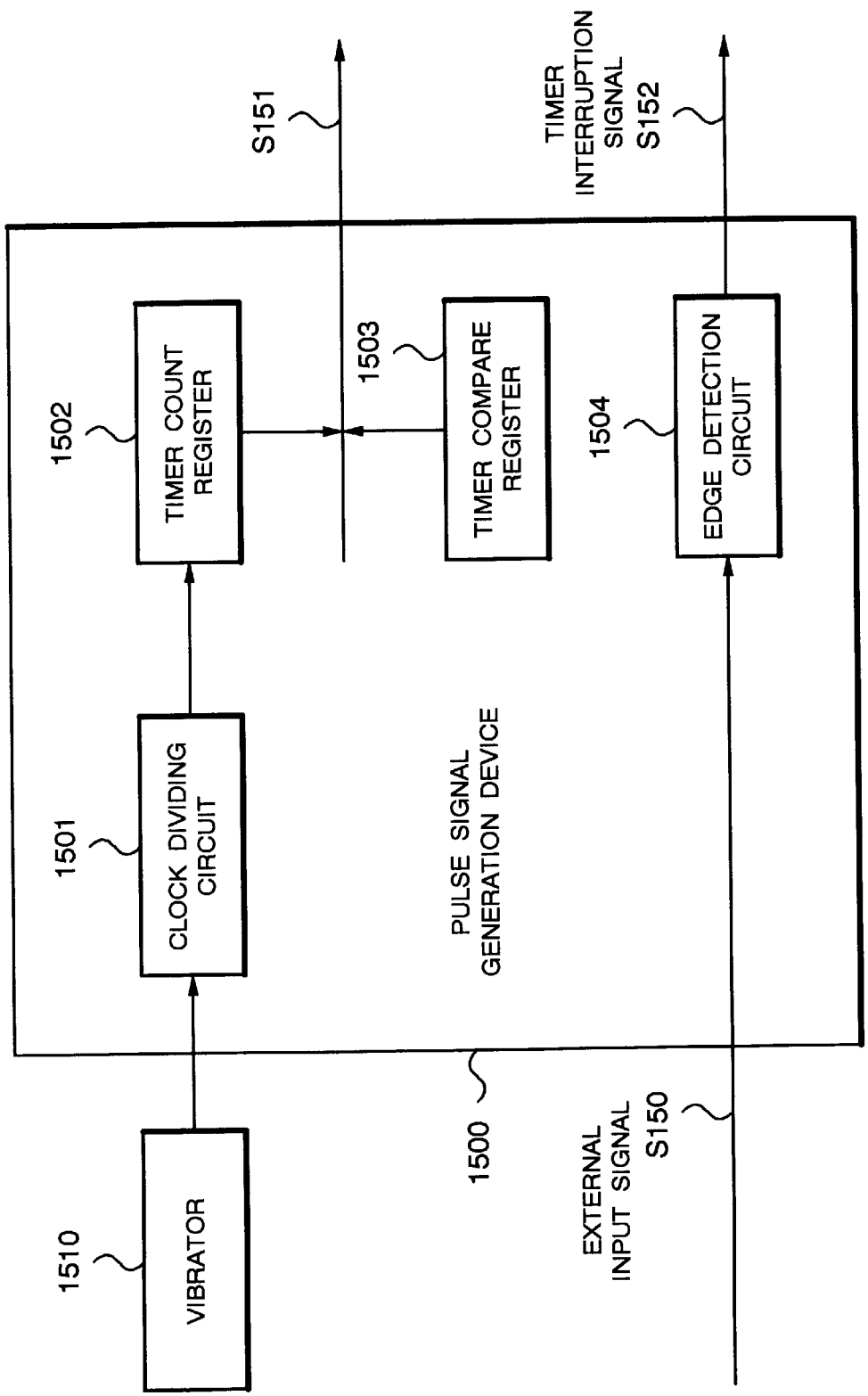
FIG. 15 is a block diagram showing structure of a conventional pulse signal generation device.
Figure 16:
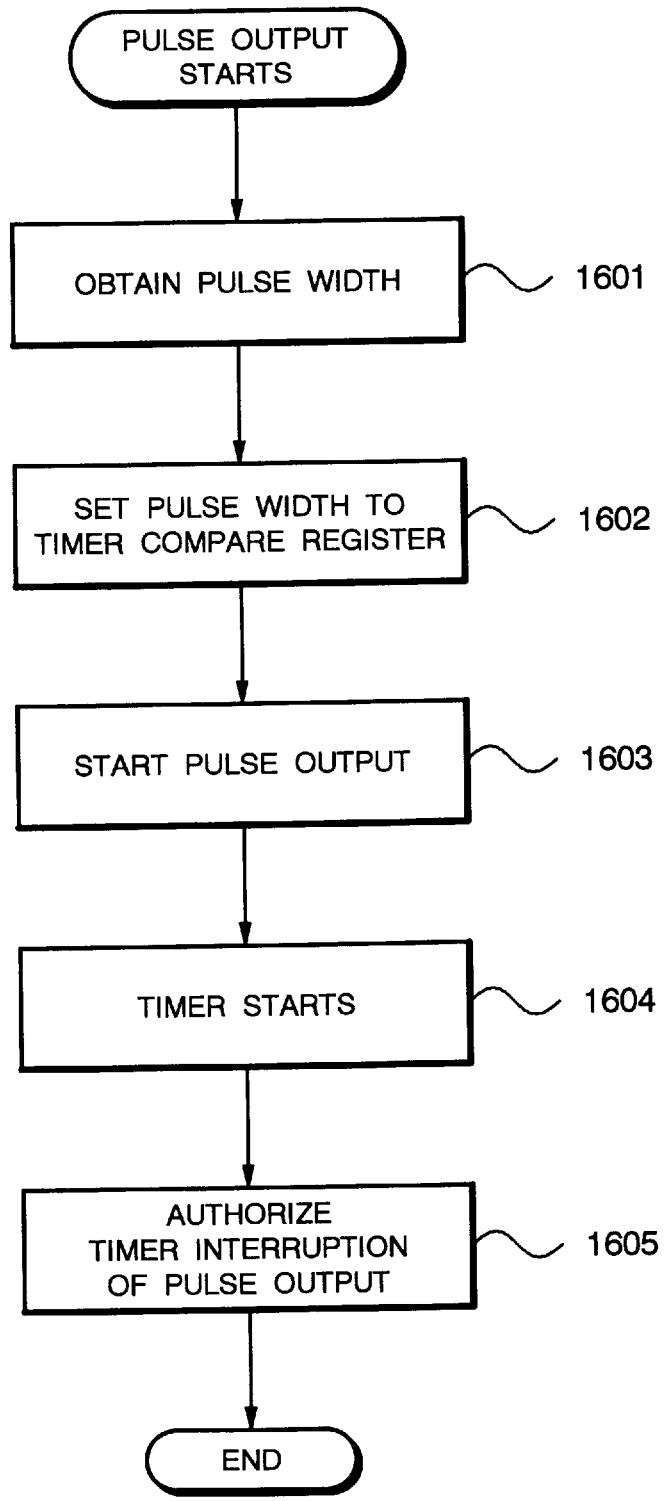
FIG. 16 is a flow chart showing operation of external interruption processing at the conventional pulse signal generation device.
Figure 17:
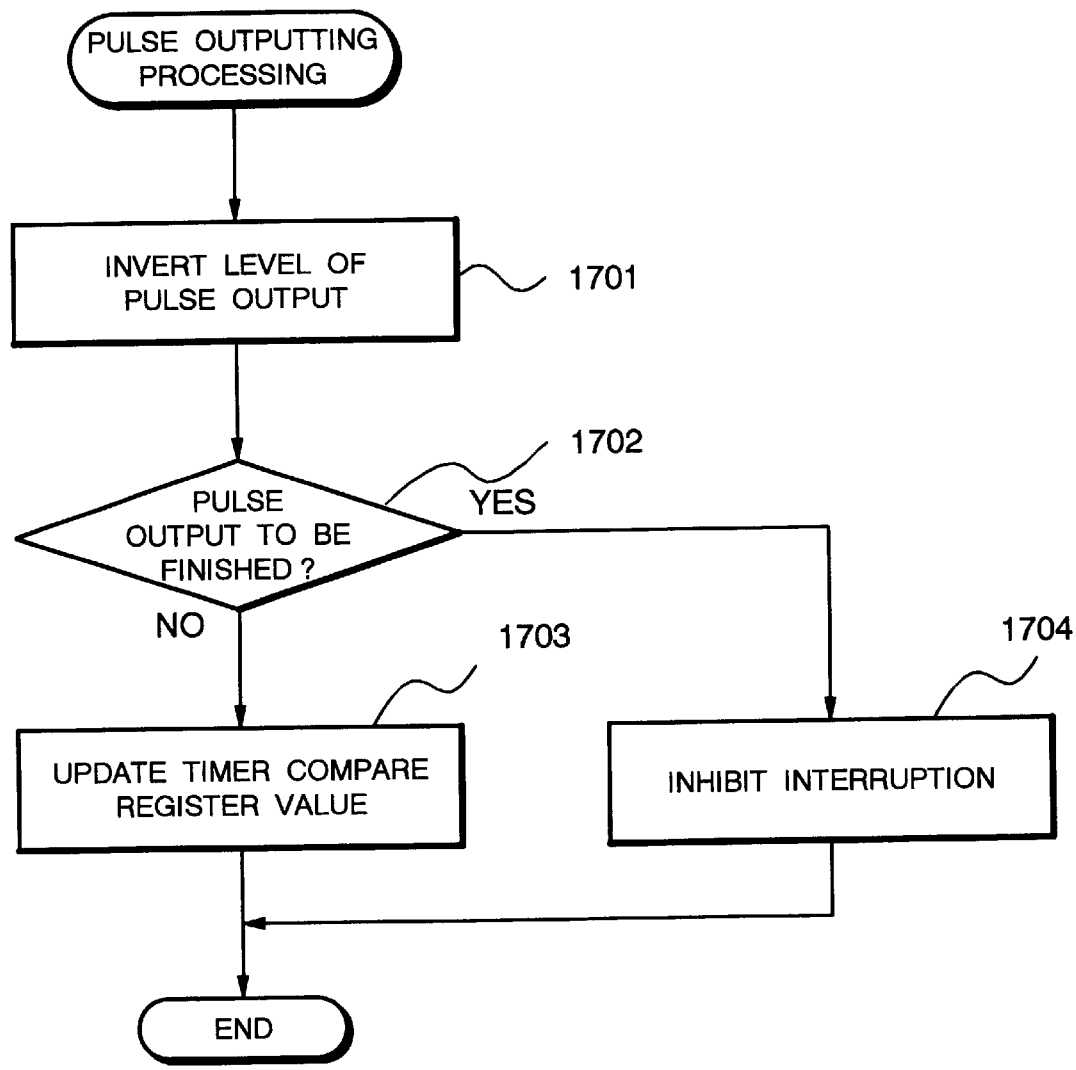
FIG. 17 is a flow chart showing operation of timer interruption processing at the conventional pulse signal generation device.
Figure 18:
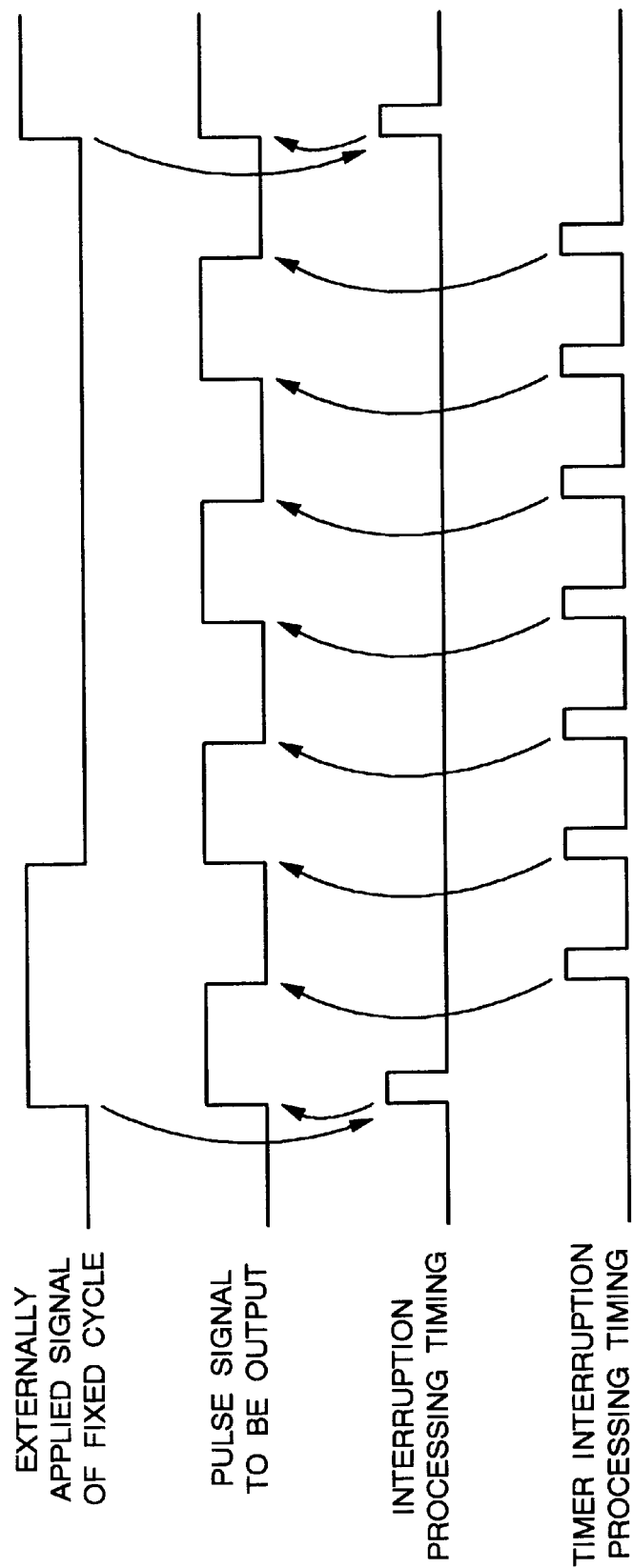
FIG. 18 is a timing chart showing pulse signal oscillation operation by the conventional pulse signal generation device.
Figure 19:
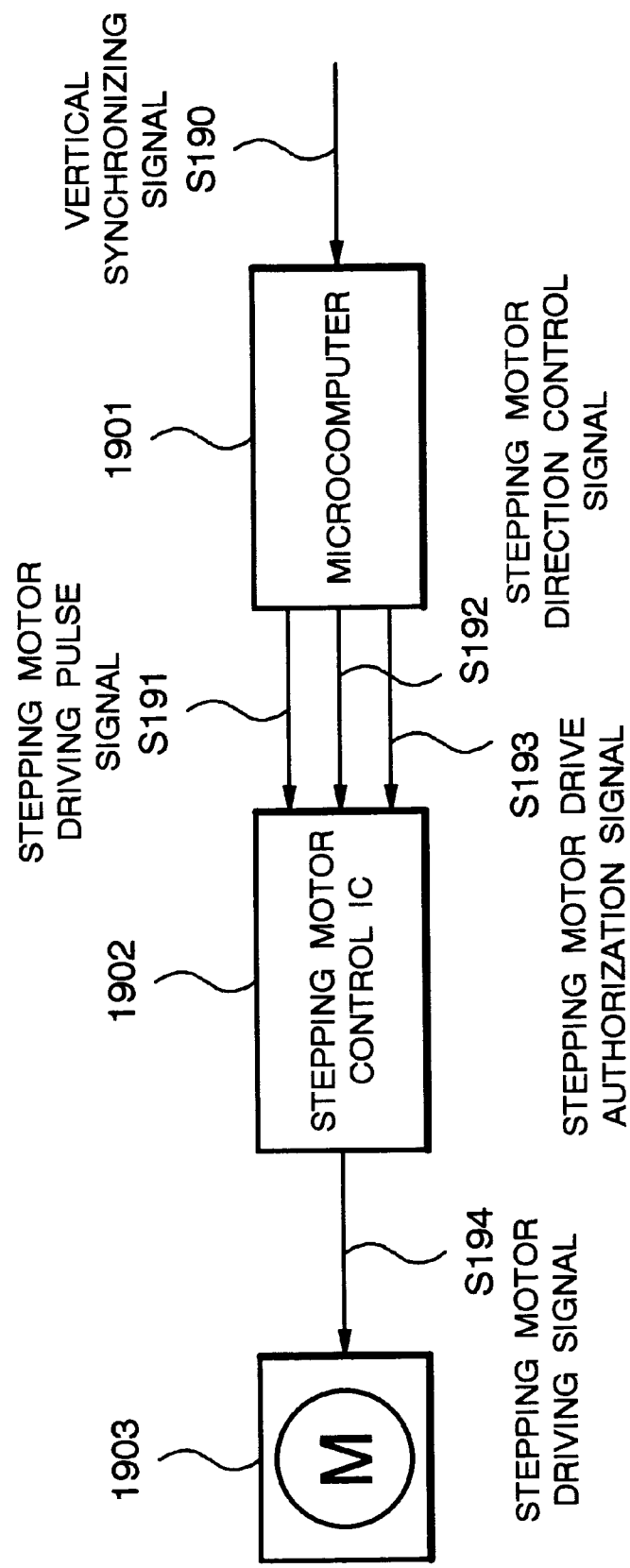
FIG. 19 is a block diagram showing structure of a stepping motor drive control device to which the conventional pulse signal generation device is applied.
Figure 20:
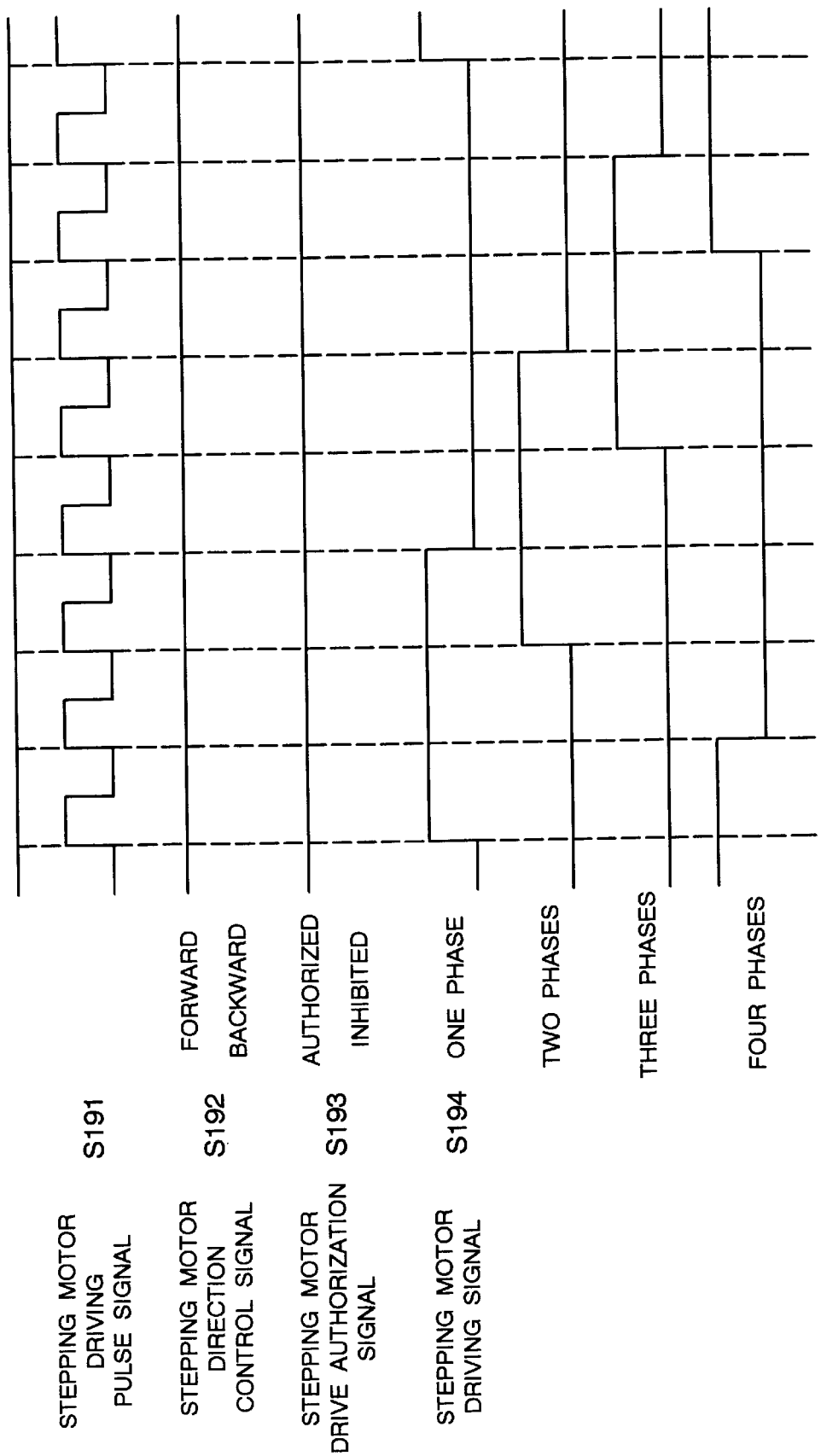
FIG. 20 is a timing chart showing stepping motor drive control by the stepping motor drive control device using the conventional pulse signal generation device.
Figure 21:
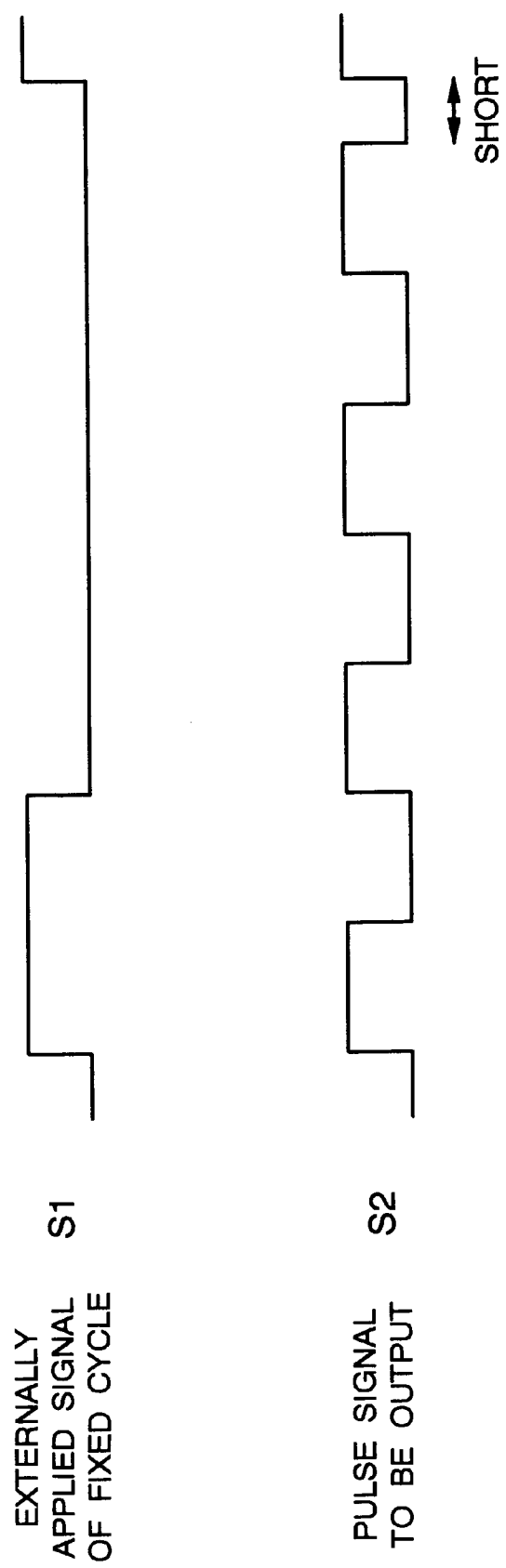
FIG. 21 is a timing chart showing an example of an error in a pulse signal which controls drive of a stepping motor.
Figure 22:
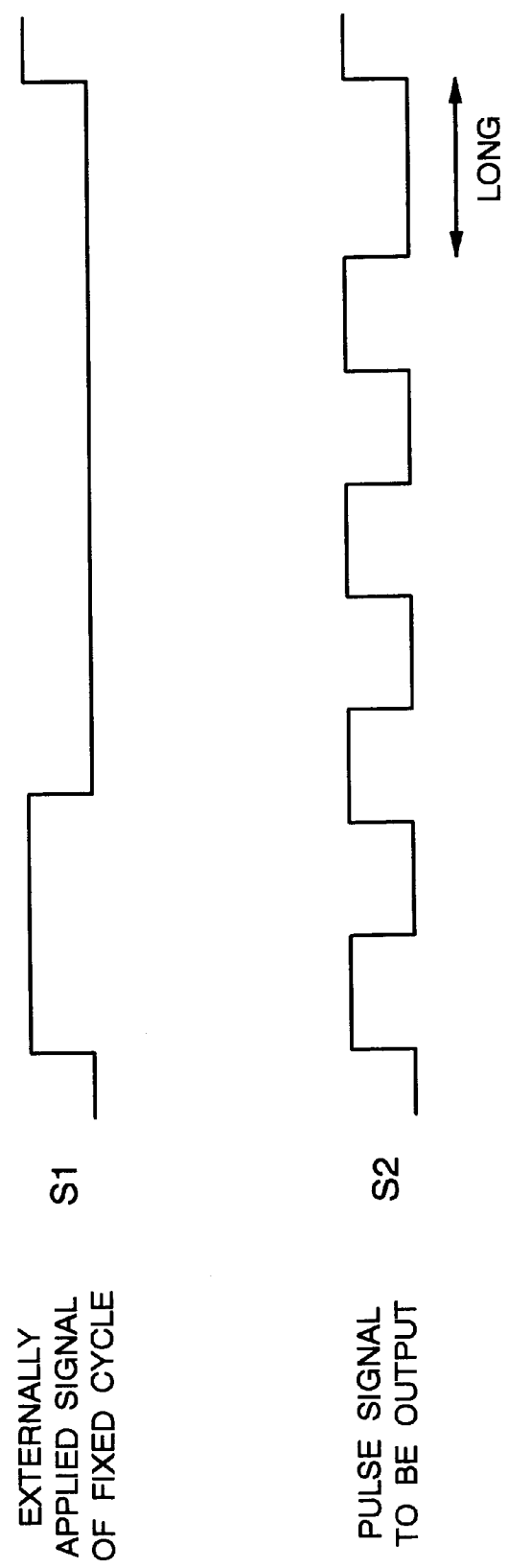
FIG. 22 is a timing chart showing another example of an error in a pulse signal which controls drive of a stepping motor.
Figure 23:
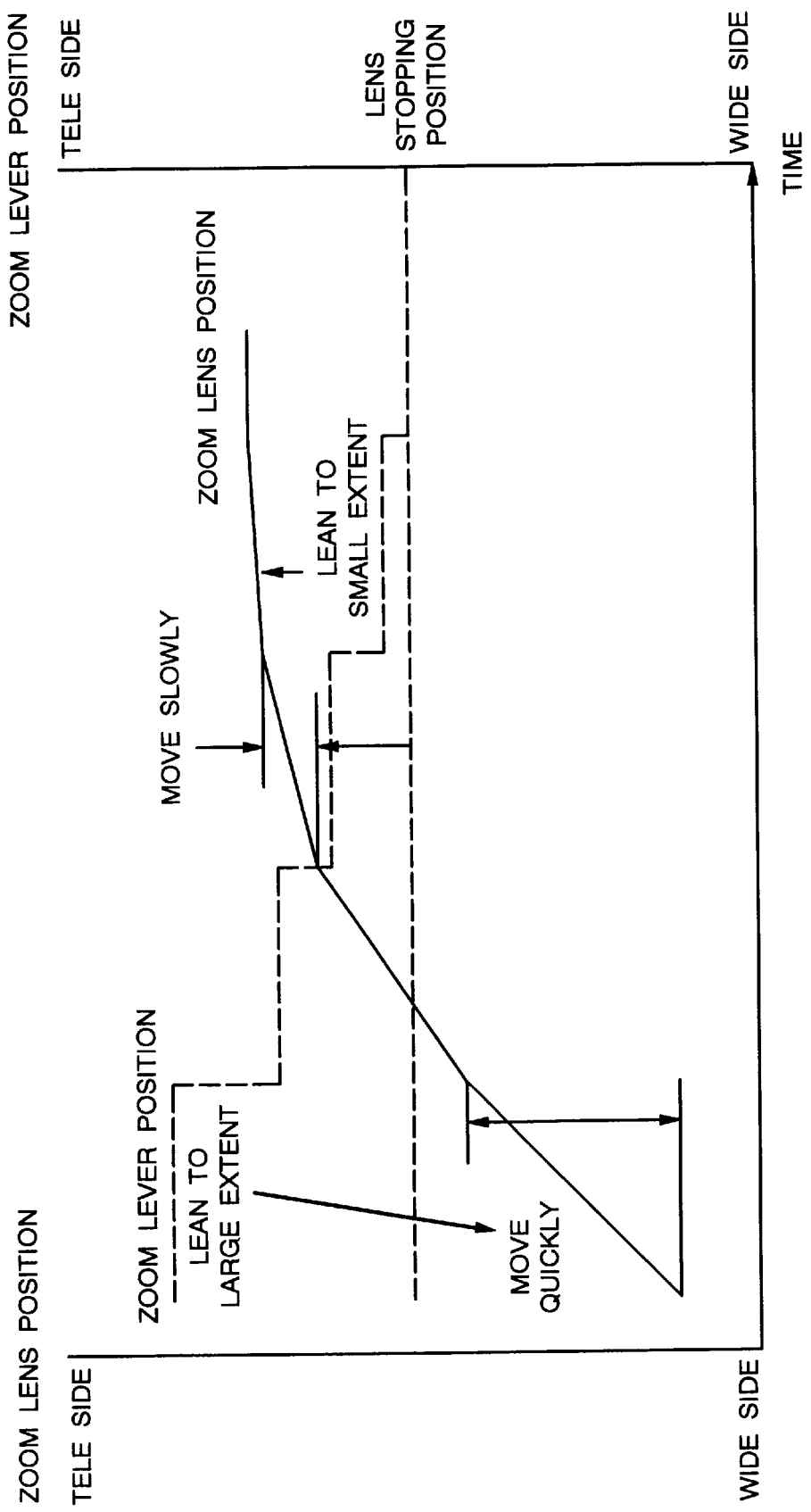
FIG. 23 is a conceptual diagram showing a relationship between manipulation of a zoom motor and a driving speed.
Figure 24:
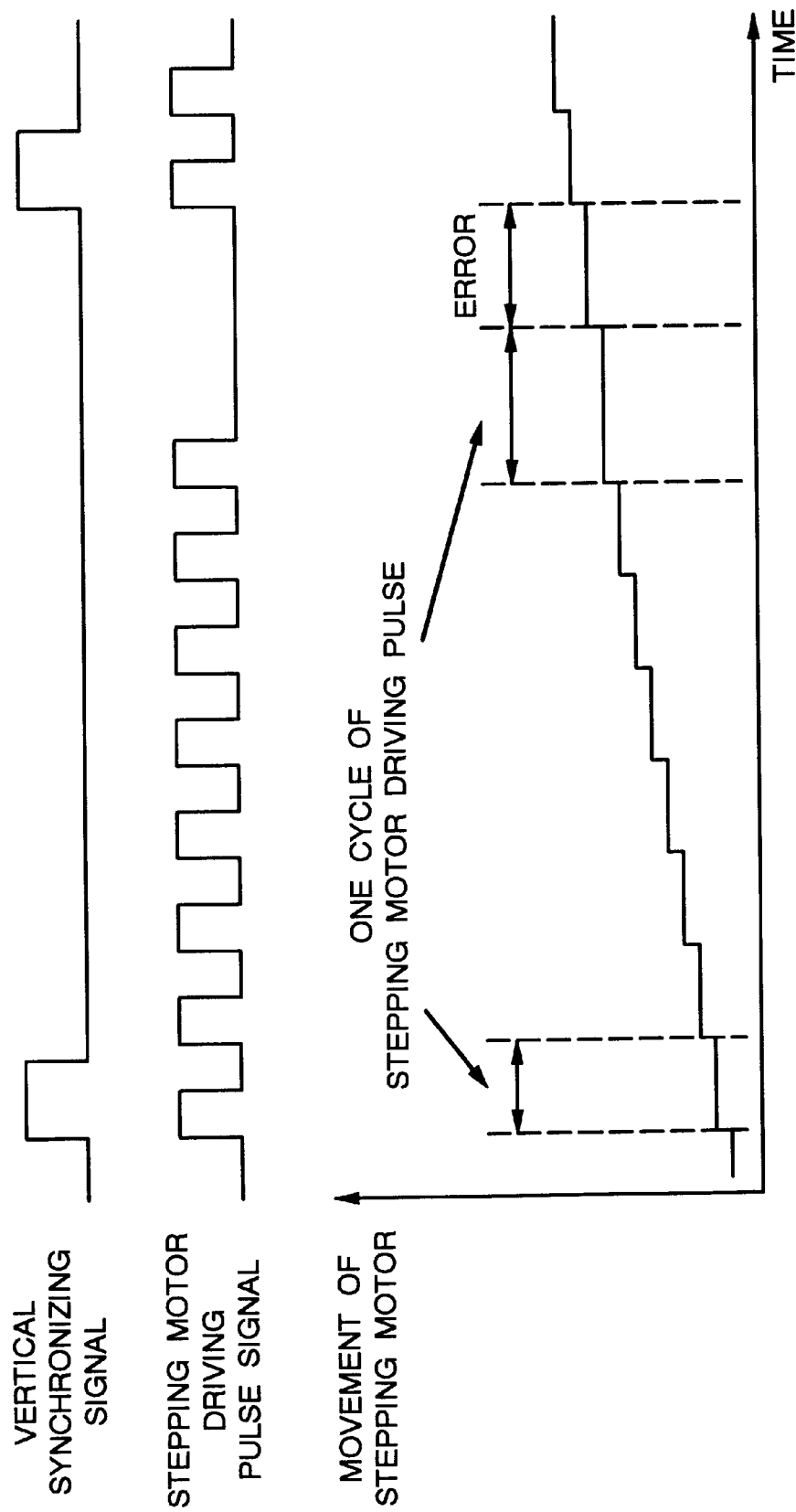
FIG. 24 is a timing chart showing an example of an error in a zoom motor driving speed caused by an error in a pulse signal for controlling drive of a stepping motor.
Figure 25:
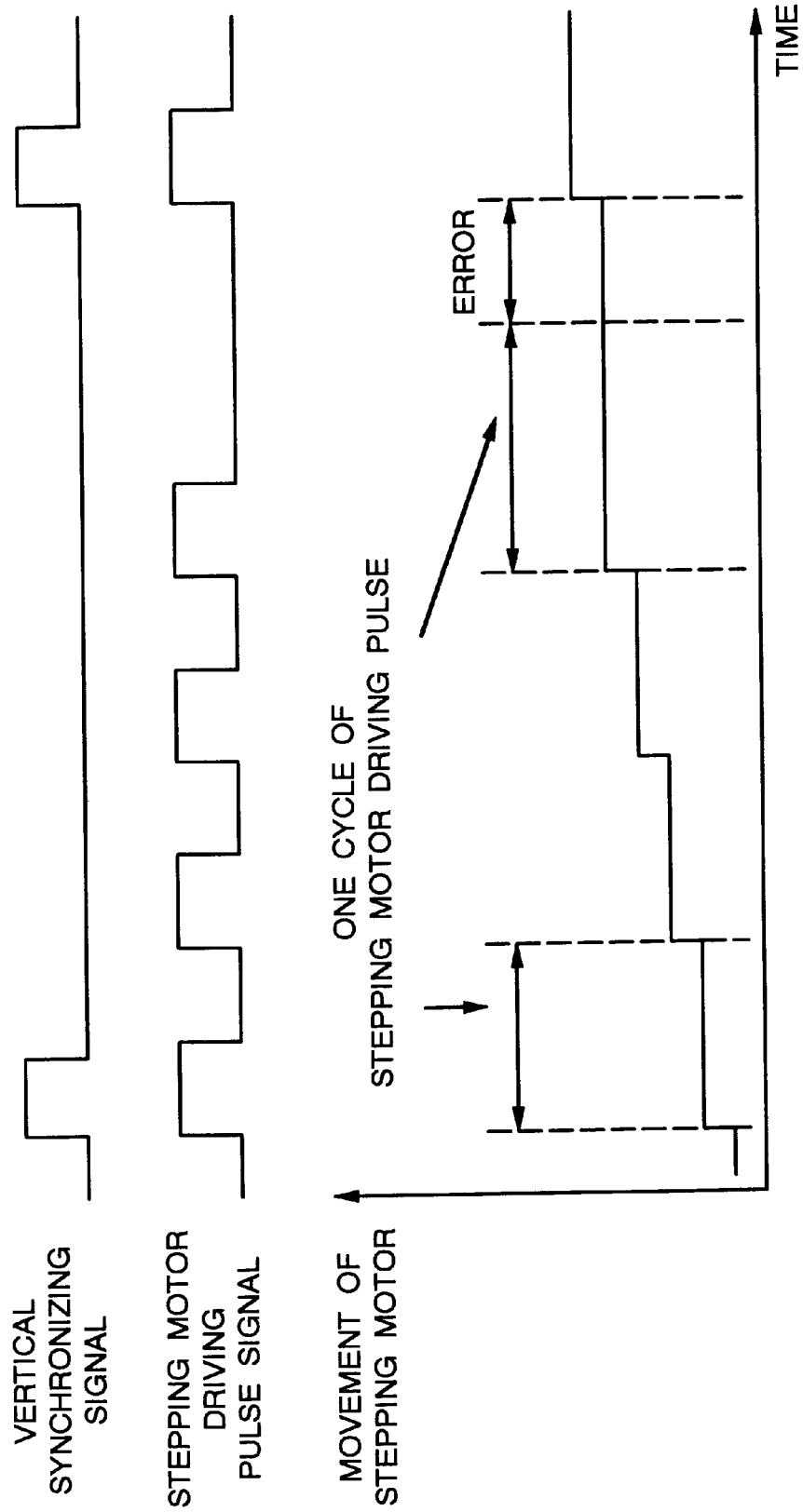
FIG. 25 is a timing chart showing another example of an error in a zoom motor driving speed caused by an error in a pulse signal for controlling drive of a stepping motor.

In the timer counting operation at Steps 1101 to 1104, the timer is counted with respect to the main clock signal starting with 0000 h during an operation period of one count of the sub-clock signal as shown in FIG. 13 to obtain a count value. Since the cycle of the sub-clock signal is set to be 500 ms as described above, an ideal count value of the main clock signal for the one count cycle of the sub-clock signal, that is, a count value obtained when the main clock signal has no error, can be obtained by calculation based on the cycle of the sub-clock signal and a set value of an oscillation frequency of the main clock oscillator 940. From a count value C1 obtained by this calculation and an actual count value C2, an error of the main clock signal can be accordingly calculated by the following expression (5).

$$\text{error}(\%) = \frac{C2 - C1}{C1} \times 100 \quad (5)$$

Figure 12:
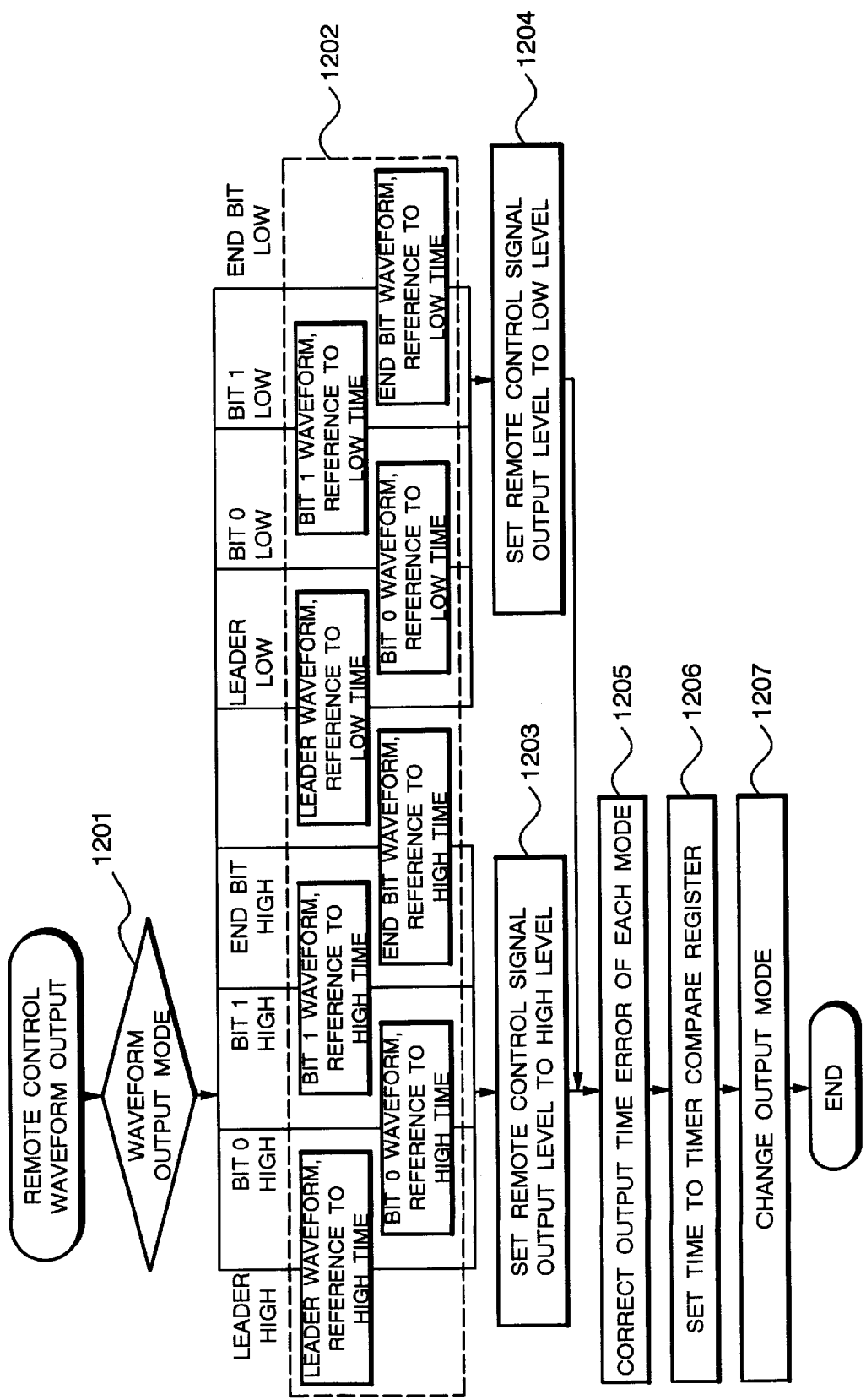
FIG. 12 is a flow chart showing operation to be conducted when the present embodiment is applied to the infrared remote controller, which is a diagram showing operation of remote control signal outputting processing.

FIG. 12 is a flow chart showing remote control signal outputting operation. With reference to FIG. 12, first conduct branch processing for setting time data corresponding to a pulse width of each signal according to the format of a remote control signal to be output (see FIG. 10) (Step 1201). Then, set time data predetermined corresponding to a pulse width for each signal (Step 1202). Next, set a high-level value and a low-level value of the remote control signal to be output (Steps 1203 and 1204). Next, based on a value of an error obtained by the main clock signal error measurement processing shown in FIG. 11, correct an error in time data (pulse width) of each signal (Step 1205). Then, set the time data whose error has been corrected to the timer compare register (Step 1206). Lastly, change the output mode of the remote control signal to a mode of the subsequent operation.

Here, remote control signal time error correction processing at Step 1205 will be described in detail. In the time data setting processing at Step 1202, time data based on an ideal count value obtained by calculation, that is, time data (hereinafter referred to as basic time) obtained assuming that the main clock signal has no error, is set which has been described in the error measurement processing in FIG. 11. At Step 1205, the basic time in question is corrected according to the following expression (6) based on the error of the main clock signal measured by the error measurement processing of FIG. 11.

$$\text{set time} = \text{basic time} \times (1 + \text{error}(\%)) \quad (6)$$

Since the foregoing operation enables even a main clock signal with an error of several percentages which is output from the main clock oscillator 940 to be corrected to have an approximately equal error level to that of the sub-clock oscillator 950 (±0.001%), an accurate remote control signal can be output.

As set forth in the foregoing, in the above-described application example, an already known cycle of a sub-clock signal is measured by using a main clock signal to measure an error of the main clock signal and an output time of a remote control signal generated by using the main clock signal is corrected based on the error. This enables an error of the main clock signal to be reduced down approximately to that of a crystal vibrator of high precision, thereby outputting an accurate remote control signal. In addition, since a relatively inexpensive vibrator with a large error can be used for the main clock oscillator 940, device manufacturing cost can be reduced.

As described in the foregoing, because at the generation of a pulse signal on the basis of a reference signal of a fixed cycle, comparison between a clock signal for use in the generation of the pulse signal and the reference signal allows a pulse width of the pulse signal to be adjusted while correcting an error of the clock signal in real time, the pulse signal generation device of the present invention and the method thereof enable a pulse signal with an appropriate frequency to be constantly generated with respect to a reference signal.

When the present invention is employed for stepping motor drive control, for example, it is therefore possible to output a pulse signal with an even pulse width corresponding to a cycle of a vertical synchronizing signal. As a result, during driving of the stepping motor, an output time of a pulse signal for driving will be neither elongated nor shortened, which makes operation of the stepping motor smooth to reduce a driving sound.

In a case where the present invention is employed in an infrared ray remote controller, even when a clock signal for use in the generation of a remote control signal has an error, correction is possible on the basis of an accurate clock signal for a timer. This eliminates the need of a vibrator of high precision for generating a clock signal for the generation of a remote control signal, whereby manufacturing cost can be reduced.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A pulse signal generation device for generating a pulse signal with a predetermined frequency corresponding to a reference signal having a fixed cycle, comprising:

reference signal cycle measuring means for receiving input of said reference signal to calculate a cycle of said reference signal using an appropriate clock signal;

pulse width calculation means for obtaining the number of pulses oscillating during a period of one cycle of said reference signal and dividing the cycle of said reference signal on the basis of said clock signal measured by said reference signal cycle measuring means by the number of pulses of said pulse signal to calculate a pulse width of said pulse signal on the basis of said clock signal; and pulse signal generation means for generating a pulse signal with a pulse width calculated by said pulse width calculation means.

2. The pulse signal generation device as set forth in claim 1, wherein said reference signal cycle measuring means counts the number of clocks of said clock signal oscillated during a period of one cycle of said reference signal to obtain a cycle of said reference signal measured by said clock signal.

3. The pulse signal generation device as set forth in claim 1, wherein said pulse width calculation means compares a calculated value of the cycle of said reference signal on the basis of said clock signal which is calculated on the assumption that said clock signal has no error and a measured value of the cycle of said reference signal obtained by actually measuring a cycle of said reference signal using said clock signal to calculate an error of said clock signal, and corrects a calculated value of the pulse width of said pulse signal on the basis of said clock signal based on an error of said clock signal.

4. The pulse signal generation device as set forth in claim 1, wherein said reference signal cycle measuring means counts the number of clocks of said clock signal oscillated during a period of one cycle of said reference signal to obtain a cycle of said reference signal measured by said clock signal, and said pulse width calculation means compares a calculated value of the cycle of said reference signal on the basis of said clock signal which is calculated on the assumption that said clock signal has no error and a measured value of the cycle of said reference signal obtained by actually measuring a cycle of said reference signal using said clock signal to calculate an error of said clock signal, and corrects a calculated value of the pulse width of said pulse signal on the basis of said clock signal based on an error of said clock signal.

5. The pulse signal generation device as set forth in claim 1, wherein said reference signal cycle measuring means, said pulse width calculation means and said pulse signal generation means are provided on a microcomputer for controlling drive of a stepping motor for use in lens control of a video camera, said reference signal is a vertical synchronizing signal, said clock signal is a system clock signal of said microcomputer, and said pulse signal to be generated is a pulse signal for controlling said stepping motor.

6. The pulse signal generation device as set forth in claim 1, wherein said reference signal cycle measuring means, said pulse width calculation means and said pulse signal generation means are provided on a microcomputer mounted on an infrared ray remote controller, said reference signal is a first clock signal to be used for a timer function, said clock signal is a second clock signal for use in the generation of a remote control signal, said pulse signal to be generated is said remote control signal, and said pulse width calculation means compares a calculated value of the cycle of said first clock signal on the basis of said second clock signal which is calculated on the assumption that said second clock signal has no error and a measured value of the cycle of said first clock signal obtained by actually measuring a cycle of said first clock signal using said second clock signal to calculate an error of said second clock signal, and corrects a calculated value of the pulse width of said remote control signal on the basis of said second clock signal based on an error of said second clock signal.

7. A pulse signal generation method of generating a pulse signal with a predetermined frequency corresponding to a reference signal having a fixed cycle, comprising the steps of:

receiving input of said reference signal to calculate a cycle of said reference signal using an appropriate clock signal;

obtaining the number of pulses oscillating during a period of one cycle of said reference signal and dividing t he cycle of said reference signal on the basis of said clock signal by the number of pulses of said pulse signal to calculate a pulse width of said pulse signal on the basis of said clock signal; and generating a pulse signal with a calculated pulse width.

8. The pulse signal generation method as set forth in claim 7, wherein at said step of calculating a cycle of said reference signal, the number of clocks of said clock signal oscillated during a period of one cycle of said reference signal is counted to obtain a cycle of said reference signal measured by said clock signal.

9. The pulse signal generation method as set forth in claim 7, wherein said pulse width calculation step comprises the steps of:
comparing a calculated value of the cycle of said reference signal on the basis of said clock signal which is calculated on the assumption that said clock signal has no error and a measured value of the cycle of said reference signal obtained by actually measuring a cycle of said reference signal using said clock signal to calculate an error of said clock signal, and correcting a calculated value of the pulse width of said pulse signal on the basis of said clock signal based on an error of said clock signal.

10. A computer readable memory storing a computer program for controlling a pulse signal generation device for generating a pulse signal with a predetermined frequency corresponding to a reference signal having a fixed cycle, said computer program comprising the steps of:

receiving input of said reference signal to calculate a cycle of said reference signal using an appropriate clock signal;

obtaining the number of pulses oscillating during a period of one cycle of said reference signal and dividing the cycle of said reference signal on the basis of said clock signal by the number of pulses of said pulse signal to calculate a pulse width of said pulse signal on the basis of said clock signal; and generating a pulse signal with a calculated pulse width.

11. The computer readable memory as set forth in claim 10, wherein at said step of said computer program of calculating a cycle of said reference signal, the number of clocks of said clock signal oscillated during a period of one cycle of said reference signal is counted to obtain a cycle of said reference signal measured by said clock signal.

12. The computer readable memory as set forth in claim 10, wherein said pulse width calculation step of said computer program comprises the steps of:
comparing a calculated value of the cycle of said reference signal on the basis of said clock signal which is calculated on the assumption that said clock signal has no error and a measured value of the cycle of said reference signal obtained by actually measuring a cycle of said reference signal using said clock signal to calculate an error of said clock signal, and correcting a calculated value of the pulse width of said pulse signal on the basis of said clock signal based on an error of said clock signal.

* * * * *